(12) United States Patent
Saghir et al.

(10) Patent No.: US 12,398,719 B2
(45) Date of Patent: Aug. 26, 2025

(54) PREDICTING WELL SITE FAILURE MODES AND TIMES USING MACHINE LEARNING ANALYTICS AND DYNACARD CLASSIFICATIONS

(71) Applicant: Schneider Electric Systems USA, Inc., Foxborough, MA (US)

(72) Inventors: Fahd Saghir, Runcorn (AU); Xavier Pasbeau, Paris (FR); Bartosz Boguslawski, Grenoble (FR); Matthieu Boujonnier, Brookline, MA (US); Loryne Bissuel-Beauvais, Montreal (CA)

(73) Assignee: Schneider Electric Systems USA, Inc., Foxboro, MA (US)

( * ) Notice: Subject to any disclaimer, the term of this patent is extended or adjusted under 35 U.S.C. 154(b) by 381 days.

(21) Appl. No.: 17/642,683

(22) PCT Filed: Sep. 11, 2020

(86) PCT No.: PCT/US2020/050494
§ 371 (c)(1),
(2) Date: Mar. 12, 2022

(87) PCT Pub. No.: WO2021/050943
PCT Pub. Date: Mar. 18, 2021

(65) Prior Publication Data
US 2022/0316314 A1 Oct. 6, 2022

Related U.S. Application Data

(60) Provisional application No. 63/059,702, filed on Jul. 31, 2020, provisional application No. 62/899,737, filed on Sep. 12, 2019.

(51) Int. Cl.
*E21B 47/009* (2012.01)
*E21B 43/12* (2006.01)
(Continued)

(52) U.S. Cl.
CPC ............ *F04B 49/20* (2013.01); *E21B 43/127* (2013.01); *E21B 47/009* (2020.05); *F04B 49/10* (2013.01);
(Continued)

(58) Field of Classification Search
CPC .......... F04B 49/20; F04B 49/10; F04B 47/02; F04B 49/065; F04B 47/00; E21B 43/127;
(Continued)

(56) References Cited

U.S. PATENT DOCUMENTS 4,483,188 A * 11/1984 McTamaney ........... H03M 7/50
417/18
4,509,901 A * 4/1985 McTamaney ......... E21B 47/009
702/182
(Continued)

FOREIGN PATENT DOCUMENTS

| CN | 102011576 A | 4/2011 |
|---|---|---|
| CN | 103886339 A | 6/2014 |
| CN | 104808648 A | 7/2015 |

OTHER PUBLICATIONS

International Search Report and Written Opinion for PCT application No. PCT/US2020/050494 issued on Dec. 12, 2020, 15 pages.
(Continued)

*Primary Examiner* — Dominick L Plakkoottam
(74) *Attorney, Agent, or Firm* — Troutman Pepper Locke LLP

(57) ABSTRACT

Systems and methods for real-time monitoring and control of well operations at a well site use machine learning (ML) based analytics at the well site. The systems and methods perform ML-based analytics on data from the well site via an edge device directly at the well site to detect operations that fall outside expected norms and automatically respond to such abnormal operations. The edge device can issue
(Continued)

alerts regarding the abnormal operations and take predefined steps to reduce potential damage resulting from such abnormal operations. The edge device can also anticipate failures and a time to failure by performing ML-based analytics on operations data from the well site using normal operations data. This can help decrease downtime and minimize lost productivity and cost as well as reduce health and safety risks for field personnel.

20 Claims, 21 Drawing Sheets

(51) Int. Cl.
F04B 49/10 (2006.01)
F04B 49/20 (2006.01)
G05B 23/02 (2006.01)
G06F 18/2415 (2023.01)
G06N 5/04 (2023.01)
G06N 20/00 (2019.01)
F04B 47/02 (2006.01)
F04B 49/06 (2006.01)

(52) U.S. Cl.
CPC ..... *G05B 23/0243* (2013.01); *G06F 18/2415* (2023.01); *G06N 5/04* (2013.01); *G06N 20/00* (2019.01); *E21B 2200/22* (2020.05); *F04B 47/02* (2013.01); *F04B 49/065* (2013.01); *G05B 2219/24065* (2013.01)

(58) Field of Classification Search
CPC .... E21B 47/009; E21B 2200/22; E21B 41/00; G05B 23/0243; G05B 2219/2406; G06N 5/04; G06N 20/00; G06F 18/2415
See application file for complete search history.

(56) References Cited

U.S. PATENT DOCUMENTS

| | | | | |
|---|---|---|---|---|
| 4,594,665 A * | 6/1986 | Chandra | ............... | E21B 47/009 417/18 |
| 7,212,923 B2 * | 5/2007 | Gibbs | ................... | E21B 47/009 702/13 |
| 8,988,237 B2 * | 3/2015 | Liu | ...................... | E21B 47/008 340/679 |
| 9,080,438 B1 * | 7/2015 | McCoy | .................. | E21B 47/009 |
| 10,382,260 B1 | 8/2019 | Narang | | |
| 11,030,064 B2 * | 6/2021 | Ding | ....................... | G06F 16/22 |
| 11,560,784 B2 * | 1/2023 | Sengul | ................... | G06N 20/00 |
| 2005/0155759 A1 * | 7/2005 | Bramlett | ............... | E21B 47/009 166/250.15 |
| 2008/0306892 A1 | 12/2008 | Crossley | | |
| 2015/0148919 A1 * | 5/2015 | Watson | .................. | G06N 5/043 700/31 |
| 2016/0102542 A1 | 4/2016 | DaCunha | | |
| 2017/0289824 A1 | 10/2017 | Figoli | | |
| 2017/0328194 A1 * | 11/2017 | Liu | ....................... | G06N 3/088 |
| 2017/0337464 A1 | 11/2017 | Rabinowitz | | |
| 2018/0283157 A1 | 10/2018 | Hadi | | |
| 2019/0345809 A1 | 11/2019 | Jain | | |
| 2019/0362269 A1 | 11/2019 | Barad | | |
| 2020/0191136 A1 * | 6/2020 | Hoefel | ................. | F04B 49/065 |
| 2020/0392822 A1 * | 12/2020 | Sengul | ................... | F04B 47/02 |
| 2020/0392833 A1 * | 12/2020 | Sengul | ................... | G06N 20/00 |
| 2020/0392834 A1 | 12/2020 | Sengul | | |

OTHER PUBLICATIONS

Boguslawski, et al., IIoT Edge Analytics: Deploying Machine Learning at the Wellhead to Identify Rod Pump Failure, SPE-192513-MS, Society of Petroleum Engineers, Nov. 29, 2018, 14 pages. Retrieved from the Internet: URL: https://www.onepetro.org/conferece-paper/SPE-192513-MS?soret=&start=0&q=192513&from_year=&peer_reviewed+&published_between=&SearchResults=true&to_year=&row=25# [retrieved on Nov. 27, 2020].

Boguslawski, Bartosz, et al. "IIoT edge analytics: Deploying machine learning at the wellhead to identify rod pump failure." SPE Middle East Artificial Lift Conference and Exhibition. OnePetro, 2018.

De Souza, A., et al. "Using artificial neural networks for pattern recognition of downhole dynamometer card in oil rod pump system" (Year: 2009); Proceedings of the 8th WSEAS Int. Conf. on Artificial Intelligence, Knowledge Engineering & Data Bases (Aiked '09).

Office Action for Chinese Patent Application No. 202080064298.6, dated Apr. 18, 2025 13 pp.

Office Action for Indian Patent Application No. 202217013745, emailed Mar. 13, 2025, 8 pp.

* cited by examiner

- Timestamp: YYYY-MM-DD HH:MM:SS
  Well A: from August 2018 to April 2019
  Well B: from Jan 2020 to end of March 2020
- Stroke_nb: Integer
- Outlier: Boolean - evaluated with pixel density
- Pump: 5 pumps for Well A, 3 for Well B
- Position: List of 100 vertices abscises
- Load: List of 100 vertices ordinate
- Failure proba. For 8 models, 8 probabilities Data Features

FIG. 14

|  | Well A | Well B |
|---|---|---|
| fluid pound | 11640 | 1 |
| gas interference | 717435 | 147533 |
| gas lock | 101172 | 101172 |
| normal | 96185 | 26315 |
| plunger stuck | 86 | 0 |
| solids grinding | 5330 | 26315 |
| solids in pump | 361 | 0 |
| worn pump | 185 | 333 |
| Total | 932394 | 301669 |

Failure Classifications

FIG. 15

- Interval between strokes is not constant (from 10s to multiple days)
- The sequence of stroke_nb contains some holes; that suggests some dynacards are missed => Interval between dynacards matters Other Considerations

- Train models with sequence of dynacards matching these criterias:
  - The sequence contains only « normal » dynacards
  - The sequence is long enough
  - The sequence is followed by a fluid pound or a gas interference dynacard

1206

- Sample section AC
- Add statistical information (mean, slope, std)

| # | Model Approach | Comment | Prediction Example |
|---|---|---|---|
| 1 | LSTM Dynacard vertices as input without preprocessing | • Extremely complicated for the network to learn as there is no physical link between the vertices | |
| 2 | XGBoost Sampling over section AC | • May require non-statistical mean to close the dynacard • Fix number of time_step • Geometry not leveraged | Improvement hints: • Combine multiple prediction horizon • Leverage all the history |
| 3 | CNN LSTM Reuse the CNN model from classification models | • Reuse the CNN classification model as an encoder for the LSTM | |

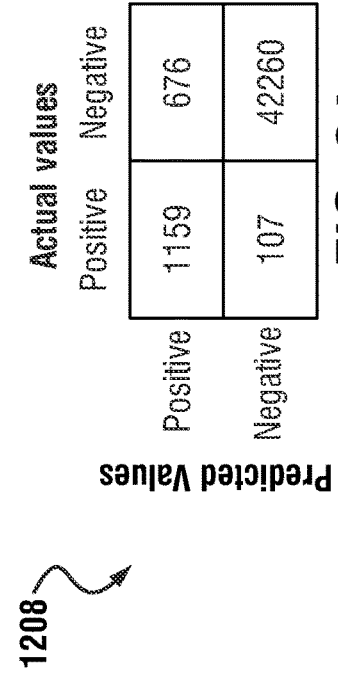

| Index | Class | Prediction | Time to Failure (s) |
|---|---|---|---|
| 56315 | normal | 1.0 | 485.0 |
| 56316 | normal | 1.0 | 454.0 |
| 56317 | normal | 1.0 | 418.0 |
| 56318 | normal | 0.0 | 382.0 |
| 56319 | normal | 0.0 | 345.0 |
| 56320 | normal | 0.0 | 314.0 |
| 56321 | normal | 0.0 | 279.0 |
| 56322 | normal | 1.0 | 241.0 |
| 56323 | normal | 1.0 | 205.0 |
| 56324 | normal | 1.0 | 173.0 |
| 56325 | normal | 1.0 | 136.0 |
| 56326 | normal | 1.0 | 105.0 |
| 56327 | normal | 1.0 | 68.0 |
| 56328 | normal | 1.0 | 31.0 |
| 56329 | gas interfernce | NaN | NaN |

① Failure Predicted

② Prediction Invalidated by Multiple FN

③ All Predictions are Consistent Until Failure

=> Failure is predicted 241 sec before failure

FIG. 25

1208 average anticipation time:   188.56830601092895
median anticipation time:   142.0
std anticipation time:   147.8382487084468
max anticipation time:   786.0
min anticipation time:   31.0

FIG. 26

1208 mean squared error:   0.012580722316062713   Best when 0
mean jaccard index:   0.5870225162855764   Best when 1
mean dice index:   0.7364835464291006   Best when 1
mean hausdorff distance:   0.16389417119503893   Best when 0

FIG. 27

PREDICTING WELL SITE FAILURE MODES AND TIMES USING MACHINE LEARNING ANALYTICS AND DYNACARD CLASSIFICATIONS

CROSS-REFERENCE TO RELATED APPLICATIONS

This application is a 371 National Phase of Int'l Application No. PCT/US2020/050494, filed Sep. 11, 2020, which claims the benefit of and priority to U.S. Provisional Application No. 62/899,737, filed on Sep. 12, 2019, and U.S. Provisional Application No. 63/059,702, filed on Jul. 31, 2020, which are incorporated by reference herein in their entirety.

TECHNICAL FIELD

The present disclosure relates to monitoring oil and gas wells to ensure proper operation of the wells and more particularly to methods and systems for real-time monitoring and controlling of well operations using machine learning (ML) based analytics at the well site to detect abnormal operating conditions.

BACKGROUND

Oil and gas wells are commonly used to extract hydrocarbons from a subterranean formation. A typical well site includes a wellbore that has been drilled into the formation and sections of pipe or casing cemented in place within the wellbore to stabilize and protect the wellbore. The casing is perforated at a certain target depth in the wellbore to allow oil, gas, and other fluids to flow from the formation into the casing. Tubing is run down the casing to provide a conduit for the oil and gas to flow up to the surface where they are collected. The oil and gas can flow up the tubing naturally if there is sufficient pressure in the formation, but typically pumping equipment is needed at the well site to bring the fluids to the surface.

Oil and gas wells often operate unattended for extended intervals due to their location in remote areas. During these intervals, numerous environmental and other factors can affect operation of the wells. When problems arise, field personnel are typically required to travel to the well site, physically inspect the equipment, and make any needed repairs. This can be a costly and time-consuming endeavor, resulting in loss productivity and profitability for well owners and operators, and can also be dangerous for the field personnel.

Thus, while a number of advances have been made in the field of oil and gas production, it will be readily appreciated that improvements are continually needed.

SUMMARY

The present disclosure relates to systems and methods for real-time monitoring and control of well operations at a well site using machine learning (ML) based analytics at the well site. The systems and methods perform ML-based analytics on operations data from the well site via an edge device directly at the well site to detect operations that fall outside expected norms and automatically respond to such abnormal operations. The edge device can issue alerts regarding the abnormal operations and take predefined steps to reduce potential damage resulting from such abnormal operations. The edge device can also anticipate failures and a time to failure by performing ML-based analytics on operations data from the well site using normal operations data. This can help decrease downtime and minimize lost productivity and cost as well as reduce health and safety risks for field personnel.

In general, in one aspect, the present disclosure relates to a method of monitoring well site operations. The method comprises, among other things, receiving well site data from a remote terminal unit (RTU) at the well site and performing machine learning (ML) based analytics on an edge device at the well site using the well site data from the RTU. The method further comprises identifying one or more dynagraph classifications on the edge device for the well site operations from the ML-based analytics and initiating a responsive action on the edge device based on the one or more dynagraph classifications. The responsive action includes at least one of logging a date and time, sending an alert message to a control system, adjusting a motor speed of a rod pump, or shutting off power to the rod pump, depending on a severity of the one or more dynagraph classifications.

In general, in another aspect, the present disclosure relates to an edge device installed at a well site and operable to monitor well site operations. The edge device comprises, among other things, a processor and a storage device coupled to the processor. The storage device stores computer-readable instructions for a well site monitoring and control application thereon that, when executed by the processor, causes the edge device to receive well site data from a remote terminal unit (RTU) at the well site, and perform machine learning (ML) based analytics on an edge device at the well site using the well site data from the RTU. The well site monitoring and control application further causes the edge device to identify one or more dynagraph classifications on the edge device for the well site operations from the ML-based analytics, and initiate a responsive action on the edge device based on the one or more dynagraph classifications. The responsive action includes at least one of logging a date and time, sending an alert message to a control system, adjusting a motor speed of a rod pump, or shutting off power to the rod pump, depending on a severity of the one or more dynagraph classifications.

In one or more embodiments, the well site operations include artificial lift operations performed by a rod pump assembly at the well site, and the well site data includes images of dynagraphs derived from the rod pump assembly at the well site.

In one or more embodiments, performing ML-based analytics includes inputting the well site data into one or more ML models, and performing ML-based analytics further includes inputting an output from each of the one or more ML models into at least one Ensemble model.

In one or more embodiments, the one or more ML models and the Ensemble model are trained using historical data, and augmented training data is generated using the historical data.

In one or more embodiments, identifying one or more dynagraph classifications includes providing a probability for each of the one or more dynagraph classifications, and the one or more dynagraph classifications include one or more of: "fluid pound," "gas interference," "gas lock," "normal," "plunger stuck," "solids grinding," and "worn pump."

In one or more embodiments, an operator is allowed to accept or reject each of the one or more dynagraph classifications, the operator is allowed to provide an alternative dynagraph classification for each of the one or more dynagraph classifications that is rejected, and Transfer Learning is performed using the alternative dynagraph classification provided by the operator.

In general, in another aspect, the present disclosure relates to an edge device installed at a well site and operable to monitor well site operations. The edge device comprises, among other things, a processor and a storage device coupled to the processor and storing computer-readable instructions for a well site monitoring and control application thereon. The well site monitoring and control application causes the edge device to monitor the well site operations according to one or more embodiments disclosed herein.

In general, in yet another aspect, the present disclosure relates a non-transitory computer-readable medium containing program logic that, when executed by operation of one or more computer processors, performs well site monitoring operations according to one or more embodiments disclosed herein.

In general, in still another aspect, the present disclosure relates to a method of anticipating failure modes at a well site. The method comprises, among other things, receiving dynacards from a remote terminal unit (RTU) at the well site, and performing machine learning (ML) based analytics on an edge device at the well site using the dynacards from the RTU. The method also comprises identifying dynacard classifications on the edge device for the well site operations from the ML-based analytics performed on the dynacards, and performing ML-based analytics on the edge device at the well site using the dynacards and the dynacard classifications. The method further comprises predicting a failure mode and a time to failure on the edge device at the well site from the ML-based analytics performed on the dynacards and the dynacard classifications, and initiating a responsive action on the edge device based on the failure mode and the time to failure. The responsive action including at least one of logging a date and time, sending an alert message to a control system, adjusting a motor speed of a rod pump, or shutting off power to the rod pump, depending on a severity of the failure mode and the time to failure.

In general, in still another aspect, the present disclosure relates to an edge device installed at a well site and operable to anticipate failure modes at the well site. The edge device comprises, among other things, a processor and a storage device coupled to the processor. The storage device stores computer-readable instructions thereon for performing a failure anticipation function. The failure anticipation function, when executed by the processor, causes the edge device to obtain dynacards and dynacard classifications for the well site and perform ML-based analytics using the dynacards and the dynacard classifications. The failure anticipation function also causes the edge device to predict a failure mode and a time to failure from the ML-based analytics performed on the dynacards and the dynacard classifications. The failure anticipation function further causes the edge device to initiate a responsive action on the edge device based on the failure mode and the time to failure. The responsive action include at least one of logging a date and time, sending an alert message to a control system, adjusting a motor speed of a rod pump, or shutting off power to the rod pump, depending on a severity of the failure mode and the time to failure.

In general, in still another aspect, the present disclosure relates to a method of anticipating failure modes at a well site. The method comprises, among other things, obtaining dynacard classifications for the well site on the edge device at the well site, and performing ML-based analytics on the edge device at the well site using the dynacards and the dynacard classifications. The method further comprises predicting a failure mode and a time to failure on the edge device at the well site from the ML-based analytics performed on the dynacards and the dynacard classifications, and initiating a responsive action on the edge device based on the failure mode and the time to failure. The responsive action includes at least one of logging a date and time, sending an alert message to a control system, adjusting a motor speed of a rod pump, or shutting off power to the rod pump, depending on a severity of the failure mode and the time to failure.

In one or more embodiments, a shape of a dynacard associated with the failure mode is predicted on the edge device at the well site from the ML-based analytics performed on the dynacards and the dynacard classifications.

In one or more embodiments, performing ML-based analytics using the dynacards and the dynacard classifications comprises performing ML-based analytics on a predefined number of consecutive dynacards. In one or more embodiments, the predefined number of consecutive dynacards all have a normal classification.

In one or more embodiments, predicting a failure mode comprises predicting one of: a fluid pound failure or a gas interference failure.

In one or more embodiments, performing ML-based analytics using the dynacard classifications includes inputting the dynacard classifications into one or more ML models. In one or more embodiments, the one or more ML models are trained using historical data, further comprising generating augmented training data using the historical data.

In general, in yet another aspect, the present disclosure relates to an edge device installed at a well site and operable to anticipate failure modes at the well site. The edge device comprises, among other things, a processor and a storage device coupled to the processor and storing computer-readable instructions for performing a failure anticipation function thereon. The failure anticipation function causes the edge device to anticipate a failure mode and time to failure at the well site according to one or more embodiments disclosed herein.

A non-transitory computer-readable medium containing program logic that, when executed by operation of one or more computer processors, performs failure mode anticipation at a well site according to one or more embodiments disclosed herein.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

FIG. 14 illustrate exemplary features of data used to anticipate future failures at an edge device in some embodiments;

FIG. 15 illustrates exemplary failure classifications that may be used to anticipate future failures at an edge device in some embodiments;

FIG. 16 illustrates data issues to be considered when using ML-based analytics to anticipate future failures at an edge device in some embodiments;

FIG. 23 illustrates exemplary ML models may be trained to anticipate future failures at an edge device;

FIG. 24 illustrates exemplary confusion matrix that may be used to evaluate the performance of trained ML models;

FIG. 25 illustrates an example of future failures being anticipated using ML-based analytics at an edge device in some embodiments;

FIG. 26 illustrates exemplary statistics on future failure anticipation time for true positives according to some embodiments;

FIG. 27 illustrates exemplary metrics on future failure anticipations according to some embodiments.

Identical reference numerals have been used, where possible, to designate identical elements that are common to the figures. However, elements disclosed in one embodiment may be beneficially utilized on other embodiments without specific recitation.

DETAILED DESCRIPTION

Figure 1:
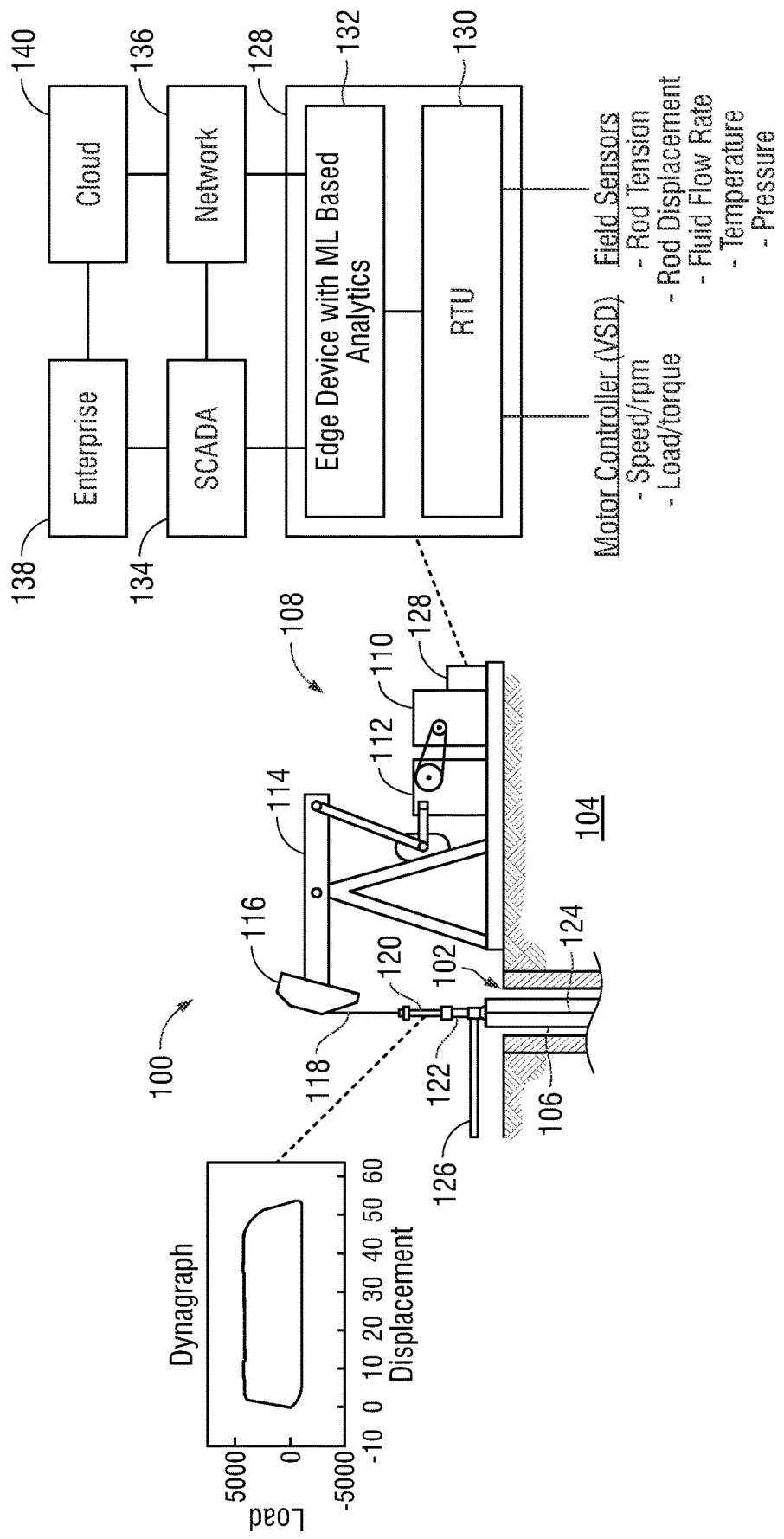
FIG. 1 illustrates an exemplary well site deployment of ML-based analytics according to embodiments of the present disclosure.

This description and the accompanying drawings illustrate exemplary embodiments of the present disclosure and should not be taken as limiting, with the claims defining the scope of the present disclosure, including equivalents. Various mechanical, compositional, structural, electrical, and operational changes may be made without departing from the scope of this description and the claims, including equivalents. In some instances, well-known structures and techniques have not been shown or described in detail so as not to obscure the disclosure. Furthermore, elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

It is noted that, as used in this specification and the appended claims, the singular forms "a," "an," and "the," and any singular use of any word, include plural references unless expressly and unequivocally limited to one reference. As used herein, the term "includes" and its grammatical variants are intended to be non-limiting, such that recitation of items in a list is not to the exclusion of other like items that can be substituted or added to the listed items.

At a high level, embodiments of the present disclosure provide systems and methods for real-time monitoring and control of well operations using machine learning (ML) based analytics at a well site. The term "analytics" as used herein generally refers to the analysis of data and the recognition and detection of meaningful patterns in the data. The disclosed systems and methods deploy ML-based analytics on an edge device directly at the well site to detect operations that fall outside expected norms and automatically respond to such abnormal operations. The term "edge device" as used herein refers to devices that are designed to provide access or entry to a network, such as a local area network (LAN), wide area network (WAN), metropolitan area network (MAN), and the like. Being able to perform ML-based analytics on edge devices provides numerous benefits, especially for remotely located well sites where computing resources usually required for ML modeling may not otherwise be available. In such cases (and other cases), performing ML modeling on an edge device allows operators to proactively manage the remote well sites. In particular, an edge device equipped with ML-based analytics can automatically detect abnormal operations that could indicate non-optimal production and possibly equipment failure, issue alerts regarding the abnormal operations, and take predefined steps to reduce potential damage resulting from such failures. This can help decrease downtime and thereby minimize lost productivity and cost as well as reduce health and safety risks for personnel who may otherwise have to make unscheduled trips to the well sites (i.e., less "windshield time").

The above benefits become even more apparent when ML-based analytics is implemented at well sites in conjunction with the broader movement toward a so-called Industrial Internet of Things (IIoT). In an IIoT landscape, well site operators increasingly make use of interconnected sensors and devices to collect and store large amounts of data directly at the well sites. This data can then be processed at the well sites by an edge device equipped with ML modeling to monitor and control well operations. Consider a well site that employs artificial lift using a reciprocating rod pump assembly to produce oil from a wellbore. Large amounts of data are commonly collected during operation of the rod pump assembly in the form of dynamometer graphs called dynagraphs or dynacards. An edge device equipped with ML modeling can process the dynagraphs in real time and recognize when the rod pump assembly may be operating abnormally. The edge device can then generate alarms, carry out contingent actions, and store the results of the processing to the Cloud as needed. The locally generated data, once labeled and processed, may be used to update and further train the ML models, commission new edge devices, and generally improve well site operations.

In short, embodiments of the present disclosure provide methods and systems for developing and deploying robust ML modeling in an IIoT environment to automatically predict failures and non-optimal operations directly at the well site, and also ensure a high level of accuracy for the predictions through ML-based analytics, thereby engendering increased operator confidence.

Referring now to FIG. 1, a schematic diagram of an exemplary well site 100 having ML-based analytics capability is shown according to embodiments of the present disclosure. As can be seen, a wellbore 102 has been drilled into a subterranean formation 104 at the well site 100 and casing 106 has been cemented into the wellbore 102. The formation 104 in this example no longer has sufficient formation pressure to produce oil naturally and therefore artificial lift is provided via a reciprocating rod pump assembly 108 installed at the well site 100. The rod pump assembly 108, also called a horse head pump jack, typically includes a motor unit 110 containing a variable speed motor, a gear box 112, beam 114, horse head 116, bridle 118, polished rod 120, tee box 122, and sucker rod 124, connected as shown. Operation of the rod pump assembly 108 is well known to those skilled in the art and thus other common components, such as a traveling valve, pump barrel, standing valve, and the like, are omitted here for economy. A discharge line 126 carries the oil and other fluids produced from the wellbore 102 to one or more holding tanks (not expressly shown) for storage and processing.

A control unit 128 at the well site 100 gathers data about various aspects of the well site 100 for monitoring and tracking purposes. The control unit 128 includes a remote terminal unit (RTU) 130 (also called remote telemetry unit) that collects data on motor operation from the motor unit 110, including motor speed and load. This motor data is generated by a motor controller, usually a variable speed drive (VSD) in the motor unit 110. The RTU 130 also collects measurements from various wireless and wired field sensors (not expressly shown) around the well site 100. These field sensors include a proximity sensor mounted near the crank arm of the rod pump assembly 108 and a load cell mounted between the bridle 118 and the polished rod 120. From this data, the RTU 130 generates dynagraphs, each dynagraph representing a graph or plot of the tension or load (vertical axis) on the rod 120 versus the displacement (horizontal axis) of the rod 120 for one stroke or pump cycle (i.e., upward and downward movement). Other data collected by the RTU 130 from the field sensors may include fluid flow rate, temperature, pressure, and the like.

An edge device 132 in the control unit 128 provides a network access or entry point for the RTU 130 to communicate the collected data to an external system, such as a supervisory control and data acquisition (SCADA) system 134 and/or a network 136 (e.g., the Internet). The edge device 132 allows the RTU 130 to transmit and receive data to and from the external system as needed over a communication link (e.g., Ethernet, Wi-Fi, Bluetooth, GPRS, CDMA, etc.). From there, the data may be forwarded to other systems within an enterprise 138 and/or to the Cloud 140 (which may include a private enterprise Cloud) for further processing as needed. Any type of edge device or appliance may be used as the edge device 132 provided the device has sufficient processing capacity for the purposes discussed herein. Examples of suitable edge devices include gateways, routers, routing switches, integrated access devices (IADs), and various MAN and WAN access devices. In accordance with embodiments of the present disclosure, the edge device 132 is provided with the capability to perform ML-based analytics on dynagraphs from the rod pump assembly 108, as discussed herein.

Figure 2:
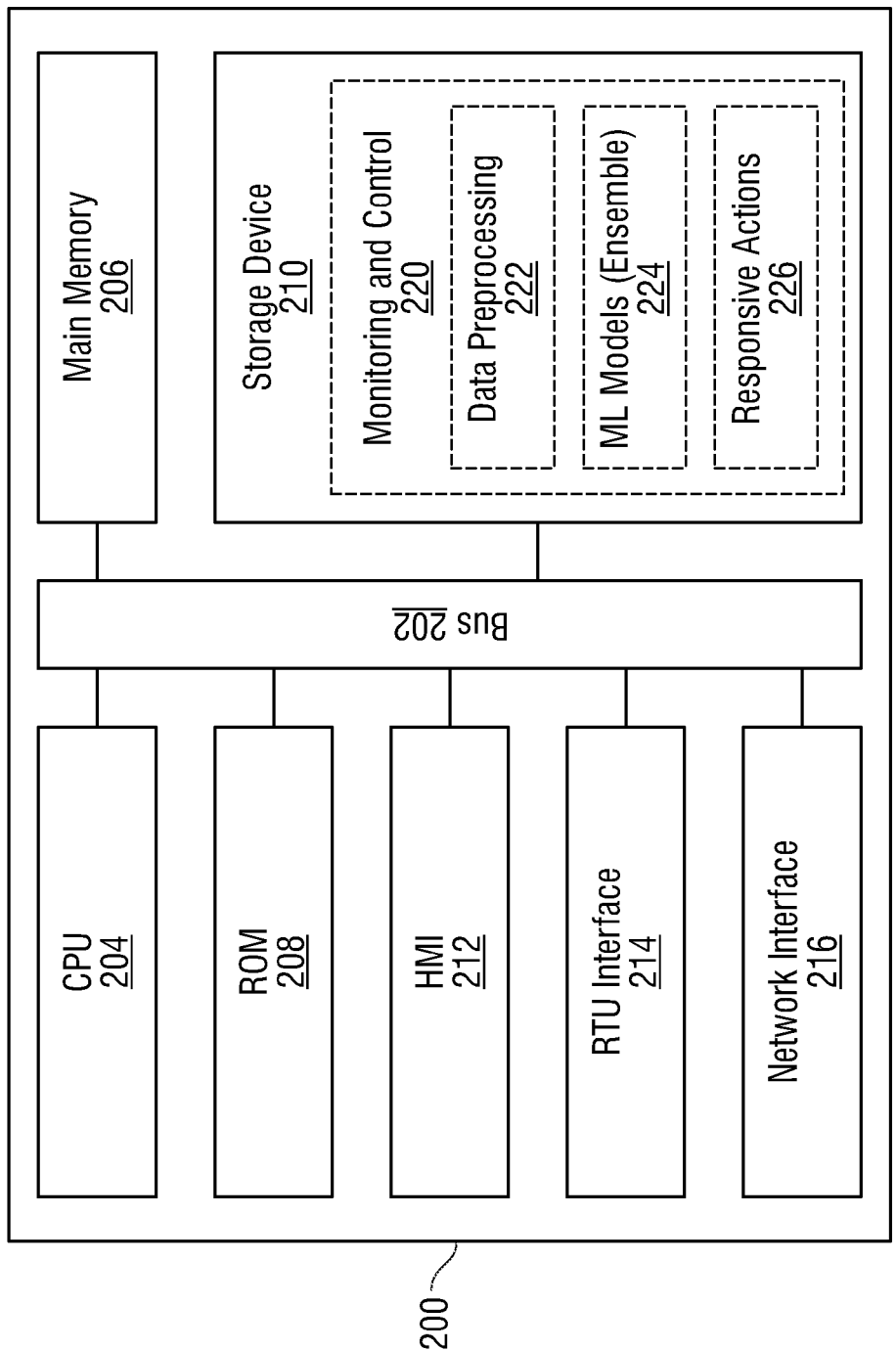
FIG. 2 illustrates a block diagram for an exemplary edge device that can perform ML-based analytics according to embodiments of the present disclosure.

FIG. 2 is a block diagram illustrating an exemplary hardware architecture 200 for the edge device 132 in accordance with embodiments of the present disclosure. The edge device 132 shown here is a gateway. In one embodiment, the edge gateway 132 includes a bus 202 or other communication pathway for transferring information within the gateway, and a CPU 204, such as an ARM microprocessor, coupled with the bus 202 for processing the information. The edge gateway 132 may also include a main memory 206, such as a random-access memory (RAM) or other dynamic storage device coupled to the bus 202 for storing computer-readable instructions to be executed by the CPU 204. The main memory 206 may also be used for storing temporary variables or other intermediate information during execution of the instructions executed by the CPU 204.

The edge gateway 132 may further include a read-only memory (ROM) 208 or other static storage device coupled to the bus 202 for storing static information and instructions for the CPU 204. A computer-readable storage device 210, such as a nonvolatile memory (e.g., Flash memory) drive or magnetic disk, may be coupled to the bus 202 for storing information and instructions for the CPU 204. The CPU 204 may also be coupled via the bus 202 to a human-machine interface (HMI) 212, such as a touchscreen interface, for displaying information to a user and allowing the user to interact with the edge gateway 132 and the RTU 130. An RTU interface 214 may be coupled to the bus 202 for allowing the RTU 130 to communicate with the edge gateway 132. A network or communications interface 216 may be provided for allowing the edge gateway 132 to communicate with the external system, such as the SCADA system 134 and/or the network 136.

The term "computer-readable instructions" as used above refers to any instructions that may be performed by the CPU 204 and/or other components. Similarly, the term "computer-readable medium" refers to any storage medium that may be used to store the computer-readable instructions. Such a medium may take many forms, including, but not limited to, non-volatile media, volatile media, and transmission media. Non-volatile media may include, for example, optical or magnetic disks, such as the storage device 210. Volatile media may include dynamic memory, such as main memory 206. Transmission media may include coaxial cables, copper wire and fiber optics, including wires of the bus 202. Transmission itself may take the form of electromagnetic, acoustic or light waves, such as those generated during radio frequency (RF) and infrared (IR) data communications. Common forms of computer-readable media may include, for example, magnetic medium, optical medium, memory chip, and any other medium from which a computer can read.

A well site monitoring and control application 220, or rather the computer-readable instructions therefor, may also reside on or be downloaded to the storage device 210. The well site monitoring and control application 220 may be executed by the CPU 204 and/or other components of the edge gateway 132 to perform ML-based analytics on dynagraphs from the RTU 130 to automatically detect abnormal operations and generate a response thereto. Such a monitoring and control application 220 may be written in any suitable computer programming language known to those skilled in the art using any suitable software development environment known. Examples of suitable programming languages may include C, C++, C#, Python, Java, Perl, and the like.

In accordance with the exemplary embodiments, the well site monitoring and control application 220 may include, among other things, a data preprocessing module 222, one or more ML algorithms or models 224, and a responsive action module 226. The data preprocessing module 224, as the name suggests, performs preprocessing (e.g., cleaning, image sizing, saliency mapping, etc.) on dynagraphs received from the RTU 130 for the monitoring and control application 220. The monitoring and control application 220 then inputs the dynagraphs to the one or more ML models 224 to determine whether they match or otherwise resemble one or more known dynagraphs. In preferred embodiments, the monitoring and control application 220 employs Ensemble modeling where multiple different ML models 224 are combined to achieve more accurate results. An Ensemble model is thus sometimes referred to as a meta model. Based on the results, the responsive action module 226 takes appropriate responsive actions. For example, if the results indicate occurrence of an abnormal or non-optimal operation, the responsive action module 226 may take action ranging from logging the date and time of the occurrence, to sending an alert message to the SCADA system 134 and/or appropriate personnel, to adjusting motor speed, and shutting off power to the motor unit 110 (e.g., for catastrophic failures), and the like. The specific responsive action taken by the responsive action module 226 depends on the severity of the abnormal operation.

As an initial step, the one or more ML models 224 should be appropriately trained before the models can perform their functions effectively. Training may be done using a self-supervised learning method in which labeled historical data is applied as an input to the ML models. Labeling refers to the process of annotating or describing the dynagraphs or specific regions in each dynagraph and creating a label or tag for those regions. The training may be done on the Cloud 140 or at the well site 100 and may involve the use of commercially available ML training tools to develop and verify the ML models. Developing the ML models on either the Cloud 140 or a computing cluster platform has an added benefit in the availability thereon of enhanced hardware resources that provide high computational capabilities, which can be very useful during the training phase. Data preprocessing and preparation form a key part of this process, as properly labeled data is needed to produce a highly accurate ML model.

As part of preprocessing the data for training purposes, historical dynagraph cards are converted to pixelated images. These images are then used to train generic ML models that are neutral as to rod pump type so as to extend the capability of the trained models to generalized dynagraph cards produced by any type of rod pump. Examples of generic ML models that may be trained include Convolutional Neural Networks (CNN), Siamese Neural Networks, Support Vector Machines (SVN), Autoencoder Neural Networks, and the like. Model predictions are then aggregated using Ensemble modeling techniques, which give more weight to a model based on its accuracy for a given class of problems. It is also possible in some embodiments to train the models using the data points making up the dynagraphs instead of the dynagraph images themselves.

Figure 3:
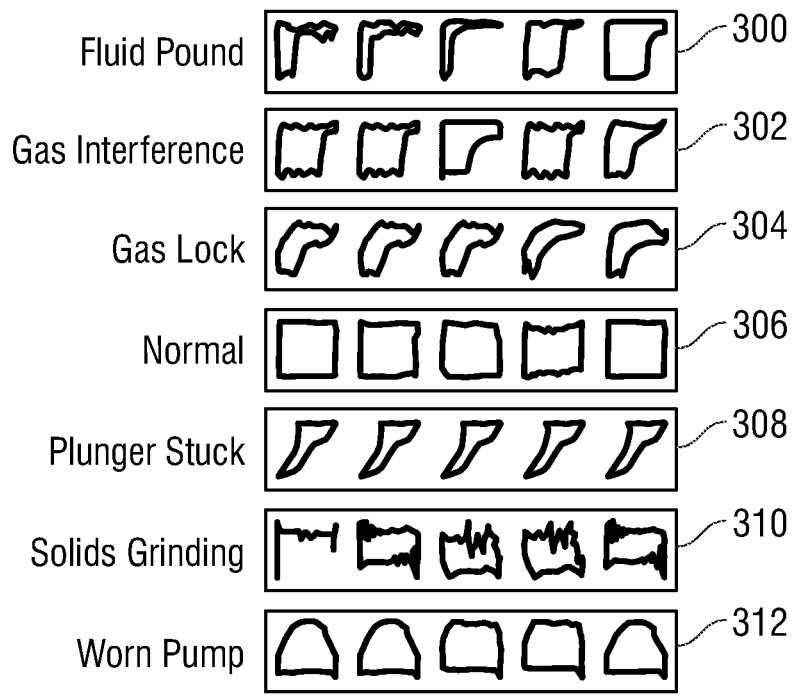
FIG. 3 illustrates a series of exemplary dynagraph classifications according to embodiments of the present disclosure.

FIG. 3 depicts exemplary dynagraphs labeled at a high level that is indicative of several categories or types of well-known rod pump operating conditions observed by field personnel over time. The types of rod pump operating conditions shown here are: "fluid pound," "gas interference," "gas lock," "normal," "plunger stuck," "solids grinding," and "worn pump." These dynagraphs may be used to train the ML models 224 such that they can subsequently determine whether dynagraphs from a well site resemble one of these dynagraphs within a certain probability distribution. Other dynagraphs representing other types of rod pump operating conditions may also be used for model training within the scope of the present disclosure.

In some embodiments, data augmentation techniques can be used to enlarge the size of the training set. Data augmentation involves using existing labeled dynagraphs to create new dynagraphs and thereby increase the size of the training data set. Models trained with an augmented data set are usually more robust and the models can even be simplified computationally compared to models that are trained with a smaller data set or fewer examples. The data augmentation takes two or more dynacards with the same label and obtains a mean dynagraph by calculating the mean values for the data points of the source dynagraphs. The result is a new dynagraph labeled with the same label as the source dynagraphs that can be added to the training set. This procedure can be repeated for many combinations of dynagraphs for the various categories of rod pump failures and non-optimal operations. New dynagraphs can be combined with existing dynagraphs to generate yet more new dynagraphs. Such data augmentation can produce a significant amount of additional labeled dynagraphs useful for model training purposes. For example, thousands of new dynagraphs may be generated from a few hundred existing dynagraphs. The number of dynagraphs used to generate a new dynagraph may be adjusted as needed.

The trained ML models 224 are then combined into an Ensemble model that is assessed against another training set not used in the initial model training stage for verification purposes. Depending on the prediction accuracy requirement (i.e., required QoS or Quality of Service), the training phase can be repeated until satisfactory results are achieved. Model performance can be improved either by refining data preprocessing techniques, such as requiring the use of high-resolution images, by increasing the number of labeled dynagraph cards, and the like.

Figure 4:
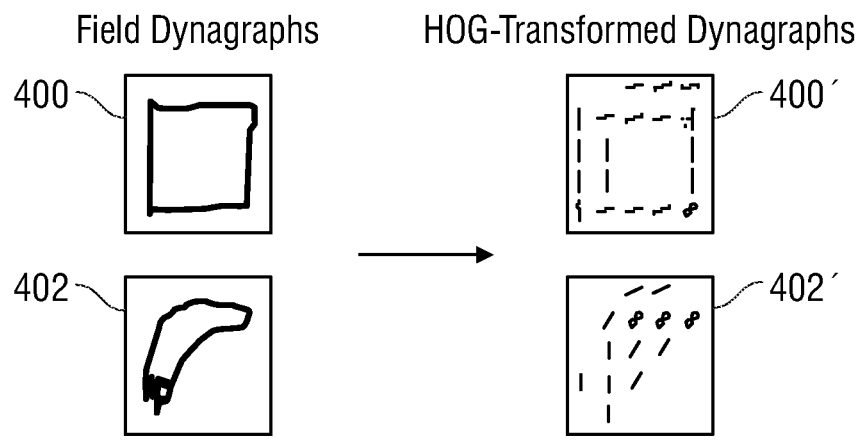
FIG. 4 illustrates examples of HOG-transformed dynagraphs according to embodiments of the present disclosure.

In some embodiments, one or more of the ML models 224 may use a data transformation technique called Histogram of Oriented Gradients (HOG), as shown in FIG. 4. HOG transforms standard dynagraphs into a series of feature descriptors that define the dynagraphs. The HOG transform is well known and commonly used in computer vision and image processing. For the present purposes, HOG allows for extraction of important information about dynagraph images based on the magnitude of pixel intensity gradients being large around the edges. Thus, HOG-transformed images are processed as image features rather than as raw images, as can be seen in FIG. 4. In the figure, the plots labeled 400 and 402 are the standard dynagraphs and the plots labeled 400' and 402' are the corresponding HOG-transformed dynagraphs showing the feature descriptors. The feature descriptors may then be processed instead of the dynagraph images themselves. Examples of models that use the HOG transform include k-Nearest Neighbors (kNN), the Support Vector Machines (SVN) mentioned earlier, and others. Generating the above feature descriptors can increase the variability of inputs provided to the ML models, which can improve the Ensemble accuracy. Ensemble accuracy can also be improved by avoiding models that are highly correlated between each other.

After satisfactory results are achieved from the learning phase, the trained and verified ML models 224 can be deployed to the edge gateway 132. In some embodiments, the models are deployed with the commissioning of the edge gateway 132 when it is connected to the RTU 130 (i.e., without connectivity to the Cloud 140). Although edge gateways have a higher processing capability relative to an RTU, consideration should be given to the type of ML models that can run efficiently on each type of edge gateway 132 to help provide satisfactory response times for prediction or inference purposes. This help ensures that the response time from an ML model is sufficiently fast to identify any abnormal dynagraph cards in a timely manner in order to allow effective action either automatically or by an operator.

Figure 5:
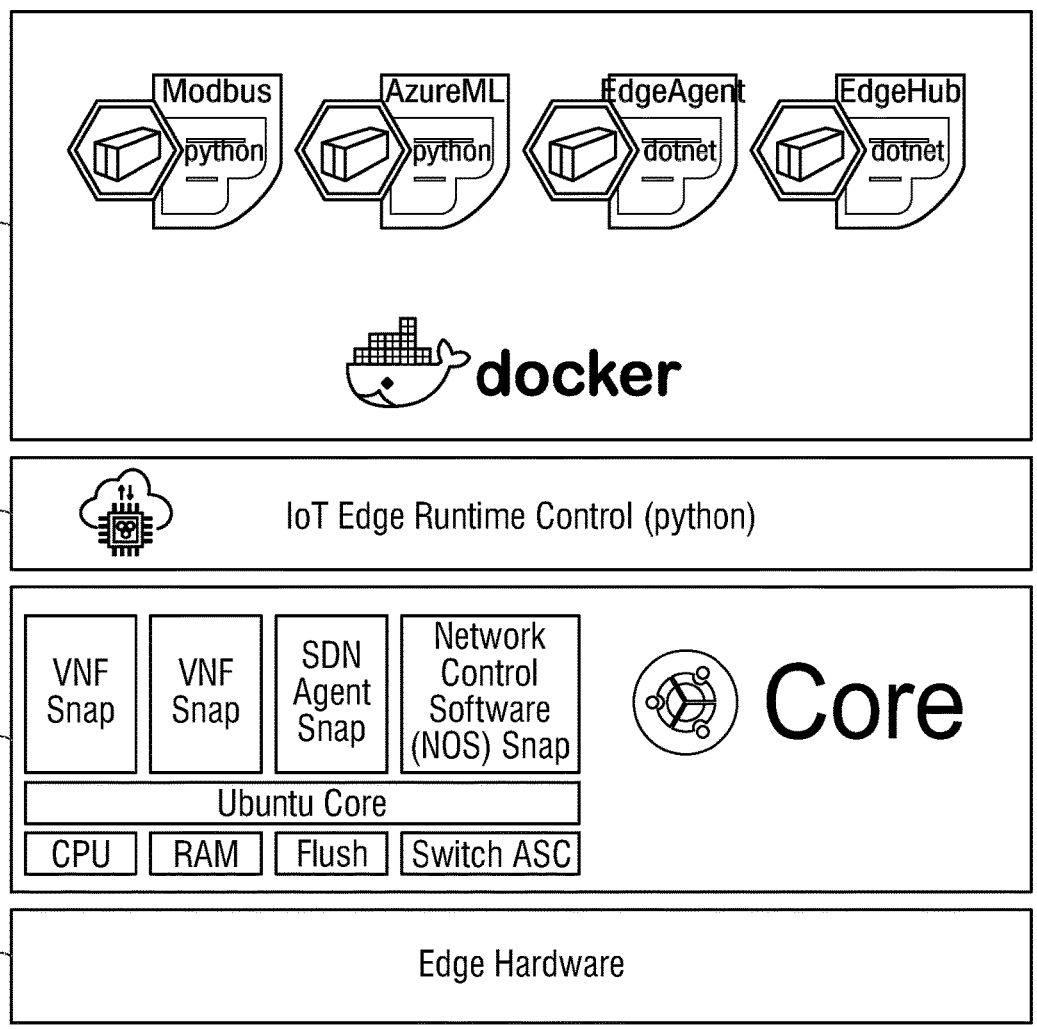
FIG. 5 illustrates an exemplary software architecture for deploying ML-based analytics to an edge device according to embodiments of the present disclosure.

FIG. 5 is a block diagram illustrating an exemplary architecture 500 that may be used to deploy ML models on the edge gateway 132. The edge architecture 500 in this example uses Microsoft IoT Edge 502, which decomposes the local processing between Docker containers 504 on top of an Ubuntu core 506 to support embedded constraints. This container-based architecture simplifies deployment, but requires Linux-based gateways that are capable of running Linux OS variants, and also minimal computing resources (i.e., CPU, memory) similar to the well-known Raspberry Pi hardware. The containers 504 used for dynagraph card prediction in this example include MODBUS, which enables Modbus communication between the RTU 130 and the edge gateway 132. This container also gathers real-time dynagraph cards from the RTU 130 after each pump stroke. Also included is AzureML, which converts the dynagraph cards to a pixelated image and uses the trained ML models 224 to identify the shape of the cards. Another container, EdgeAgent, checks hardware integrity and ensures all necessary processes are running seamlessly. And the EdgeHub container enables communication with a Cloud platform (e.g., via an MQTT protocol) using a publish/subscribe methodology. Cloud-connectivity allows the edge gateway 132 to be remotely monitored and managed for maintenance purpose, as well as for tracking the effectiveness and accuracy of the ML models, and can also trigger Transfer Learning remotely, a process discussed later herein. In short, the ML model deployment architecture 500 depicted in FIG. 5 is applicable to any edge gateway that meets minimum hardware requirements, and the use of the containers 504 to deploy the ML models and other associated components makes interoperability with different hardware platforms seamless and easy to manage. Those having ordinary skill in the art will understand that the invention is not limited to this particular selection and arrangement of containers, and that additional and/or alternative containers may be used within the scope of the present disclosure.

Once the ML models 224 and their supporting components are deployed on the edge gateway 132, real-time inferencing can commence with the gateway acquiring dynagraphs from the RTU 130. The edge gateway 132 receives the dynagraphs from the RTU 130 as load and displacement data points and uses the preprocessing module 222 of the monitoring and control application 220 to generate pixelated images of the dynagraph based on the data points. The preprocessing module 222 further preprocesses these pixelated dynagraph images, for example, by cleaning the images and normalizing them to a predefined size and format. The ML models 224 on the edge gateway 132 then infers the dynagraph type (see FIG. 3) using Ensemble modeling. In particular, for each cycle of the rod pump (i.e., one dynagraph), a weighted output is produced that indicates the probability of the dynagraph matching a certain type. The responsive actions module 226 receives this output and takes appropriate action, including raising an immediate flag to the SCADA system 134 of the most likely cause of any pump problem, as discussed later. In some embodiments, the output is also provided as feedback to the RTU 130 to raise a flag to the SCADA system 134.

Figure 6:
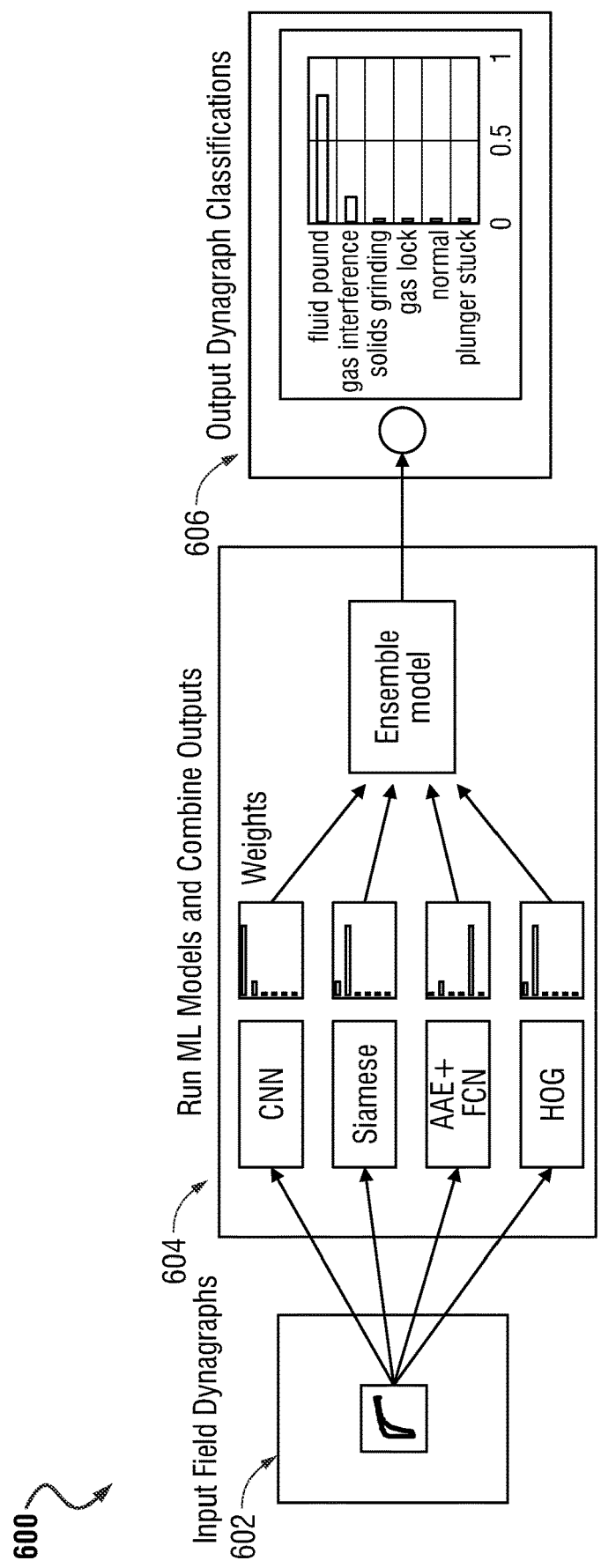
FIG. 6 illustrates an exemplary workflow for identifying dynagraphs using ML-based analytics according to embodiments of the present disclosure.

FIG. 6 depicts a high-level workflow 600 illustrating the ML-based dynagraph inference or recognition process performed on the edge gateway 132 as disclosed herein. The workflow 600 generally begins at stage 602 where dynagraphs from a rod pump assembly like the rod pump assembly 108 are input into the edge gateway 132. These dynagraphs then undergo preprocessing where they may be cleaned and conformed to a standardized size, format, and other criteria. In a typical well site deployment, a rod pump assembly generates a dynagraph every few seconds, depending on pump stroke speed, so the edge gateway 132 preferably can recognize a dynagraph every few seconds in order to provide indications of pump performance in real time.

At stage 604, the preprocessed dynagraphs are run through the various ML models in the edge gateway 132. These ML models may include any of the ML models mentioned earlier as well as other well-known models, for example, CNN, Siamese, AE+FCN (Autoencoder+Fully-Connected Network), HOG SVN, and HOG kNN (k-Nearest Neighbors). Each model takes as an input the same preprocessed dynagraph cards and provides that model's probability distribution of the dynagraph types. Those probability distributions are then input into the Ensemble model (i.e., a meta-model) that combines them and provides the final dynagraph type identifications. There may be two (or more) Ensemble models that process the outputs from the ML algorithms in some embodiments, depending on the level of accuracy desired. The results of the Ensemble models may then be averaged to provide a more accurate inference.

At stage 606, the identified dynagraph types are provided as an output of the edge gateway 132. In the example shown, the probability distribution of dynagraph types for the dynagraph being process identifies "fluid pound" as the most likely dynagraph type, followed by a lower probability for "gas interference," with a negligible probability for the remaining dynagraph types. This probability distribution may then be displayed on the edge gateway 132, for example, on the HMI 212 thereof, as well as provided to the SCADA system 134. In some embodiments, the edge gateway 132 sends to the RTU 130 the rod pump operating condition corresponding to the dynagraph type that has the highest probability.

Figure 7:
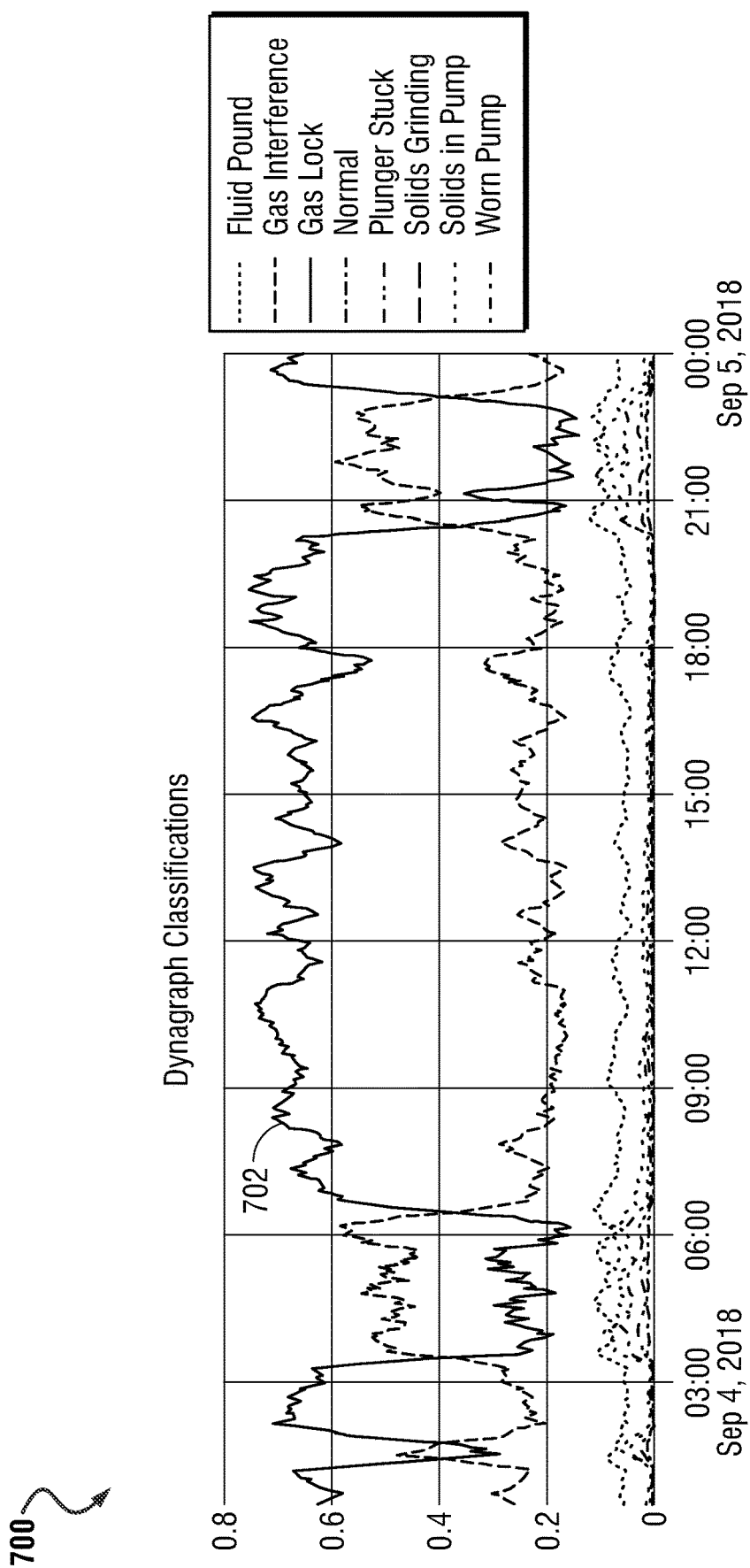
FIG. 7 illustrates an exemplary classification presentation according to embodiments of the present disclosure.

FIG. 7 shows an exemplary graphical presentation 700 of the outputs of the Ensemble model (or models) as displayed, for example, on an HMI (e.g., HMI 212) or other display of an edge gateway equipped with the ML-based analytics capability disclosed herein. The presentation 700 shows dynagraph classifications reflecting possible operating conditions for a given rod pump assembly over the course of one day based on the dynagraphs from that rod pump assembly, with the vertical axis indicating probability and the horizontal axis showing time. Each plot represents the probability that a dynagraph matches or resembles one of the dynagraph classifications from FIG. 3 (within a given QoS). The plot labeled 702, for example, indicates the probability that a dynagraph matches or resembles the dynagraphs for a rod pump assembly experiencing gas lock. As can be seen, the Ensemble model has identified a large number of dynagraphs as having a high probability of being either gas lock dynagraphs, particularly between 6:00 AM and 9:00 PM, or gas interference dynagraphs. From this presentation 700, an operator can quickly surmise that the rod pump assembly was likely having gas lock problems or gas interference problems at various times throughout.

Figure 8:
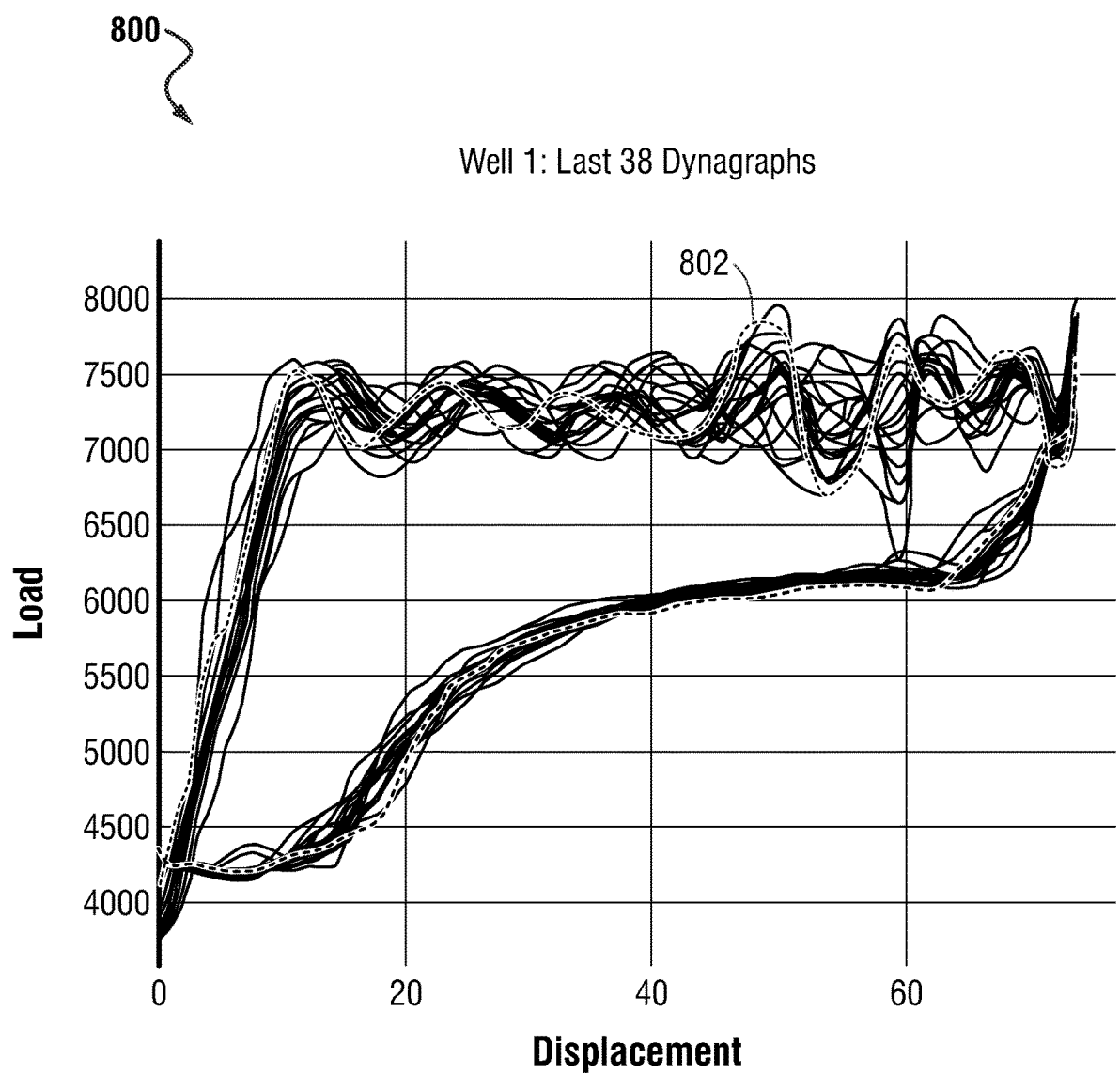
FIG. 8 illustrates an exemplary dynagraph evolution presentation according to embodiments of the present disclosure.

FIG. 8 shows another exemplary graphical presentation 800 of the outputs of the Ensemble model for a given rod pump assembly as displayed, for example, on the HMI (e.g., HMI 212) or other display of the edge gateway. This presentation 800 is an extension of the dynagraph classification presentation 700 from FIG. 7 and shows the actual dynagraphs at selected points in time for the given rod pump. The operator can click on any point in time in the presentation 700 and view (e.g., via a popup window, new screen, etc.) a corresponding dynagraph, indicated at 802, in the presentation 800. The corresponding dynagraph 802 may be colored (e.g., red) or otherwise highlighted in the dynagraph presentation 800 in some embodiments. In addition, the dynagraph presentation 800 also shows several immediately preceding dynagraphs (e.g., 37 preceding dynagraphs) overlaid on one another. These preceding dynagraph may also be colored (e.g., blue) or otherwise made distinguishable in some embodiments. The operator may then cycle through the various dynagraphs (e.g., via a slider, knob, etc.) to see the evolution of the rod pump assembly from normal operating conditions to, for instance, gas interference.

Figure 9:
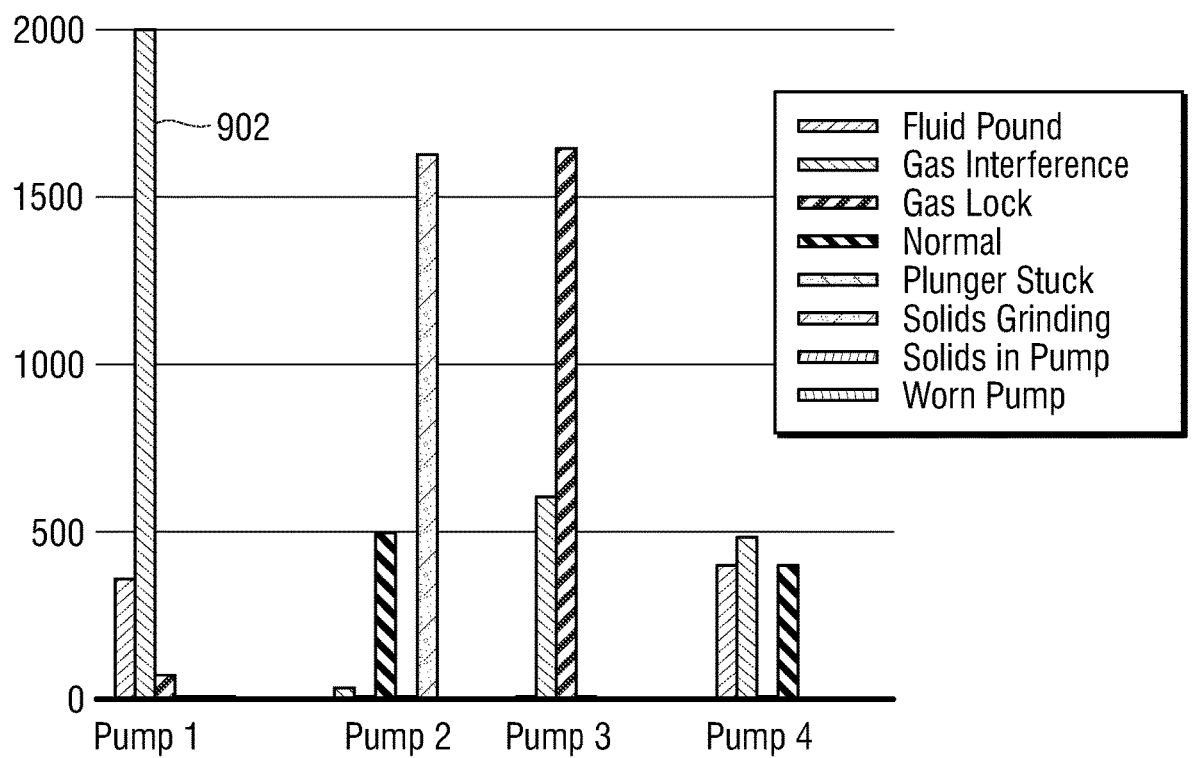
FIG. 9 illustrates an exemplary summary of dynagraph classifications according to embodiments of the present disclosure.

FIG. 9 combines the outputs of several Ensemble models from several edge gateways equipped with ML-based analytics into a summary presentation 900 displayed, for example, at a SCADA system or on an operator terminal. The presentation 900 shows dynagraph classifications reflecting possible operating conditions for several given rod pump assembly over the course of one day based on the dynagraphs from that rod pump assembly, with the vertical axis indicating number of dynagraphs (i.e., pump strokes) and the horizontal axis identifying individual pumps. Each bar represents the number of dynagraph for a given rod pump assembly that match or resemble one of the dynagraph classifications from FIG. 3 (within a given QoS). The bar labeled 902, for example, indicates that nearly 2000 dynagraphs from Rod Pump 1 match or resemble the dynagraphs for a rod pump assembly experiencing gas interference. This summary allows an operator to easily spot pumps with specific abnormal conditions for further investigation.

In addition to the inference process described above to predict the rod pump current state in real time, in some embodiments, a process can also be deployed on the edge gateway 132 called "Transfer Learning." This process can be used if the prediction accuracy using generic ML models is considered to be not sufficiently accurate. For example, the ML models may be unable to identify a dynagraph card that was not included in the training phase if the card is unique to a specific pump behavior. As another example, the ML models may be unable to make a clear distinction between two dynagraph card types that are similar to each other, such as "gas interference" and "gas lock" dynagraph cards. In such cases, the dynagraph cards may be labeled locally by a field operator via a locally available HMI. These manually labeled cards can then be used to retrain the models (or parts thereof) to improve the ability of the models to identify a dynagraph card that reflects behavior that is unique to a particular pump or to better distinguish between similar cards.

Figure 10:
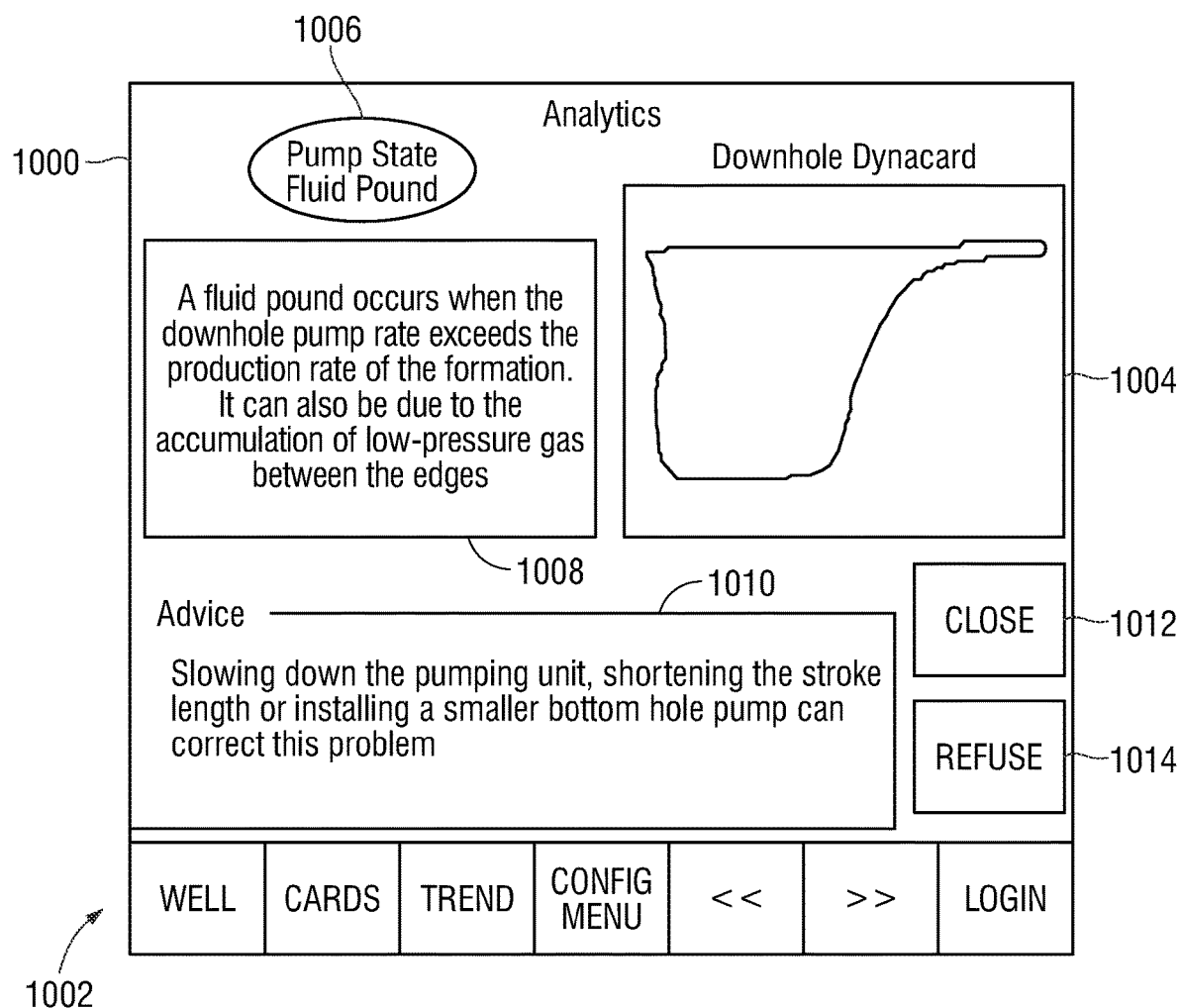
FIG. 10 illustrates an exemplary user feedback interface according to embodiments of the present disclosure.

FIG. 10 depicts a graphical user interface 1000 that may be displayed, for example, on the HMI (e.g., HMI 212) or other display of an edge gateway for implementing the Transfer Learning mentioned above. In this example, the user interface 1000 includes several navigation buttons, indicated generally at 1002, that allow an operator to navigate and otherwise scroll through and access various functions available on the edge gateway. A dynagraph area 1004 displays the dynagraph of interest, which may be the current dynagraph or an older dynagraph. A pump state area 1006 indicates the dynagraph type or classification as inferred by the Ensemble model (or models). In this example, the Ensemble model (or models) has identified the dynagraph shown in area 1004 as likely matching or resembling dynagraphs for a rod pump experiencing a fluid pound condition. A description area 1008 provides a brief description of the fluid pound dynagraph classification, and an advice area 1010 provides recommended actions or steps for the proffered dynagraph classification. The operator may press a close button 1012 to accept the proffered dynagraph classification, or the operator may press a refuse button 1014 to decline the proffered dynagraph classification. In the latter case, the operator may then label the dynagraph with his own classification, which is then stored in a feedback database with the dynagraph of interest for subsequent consideration and use in model retraining and readjustment.

Figure 11:
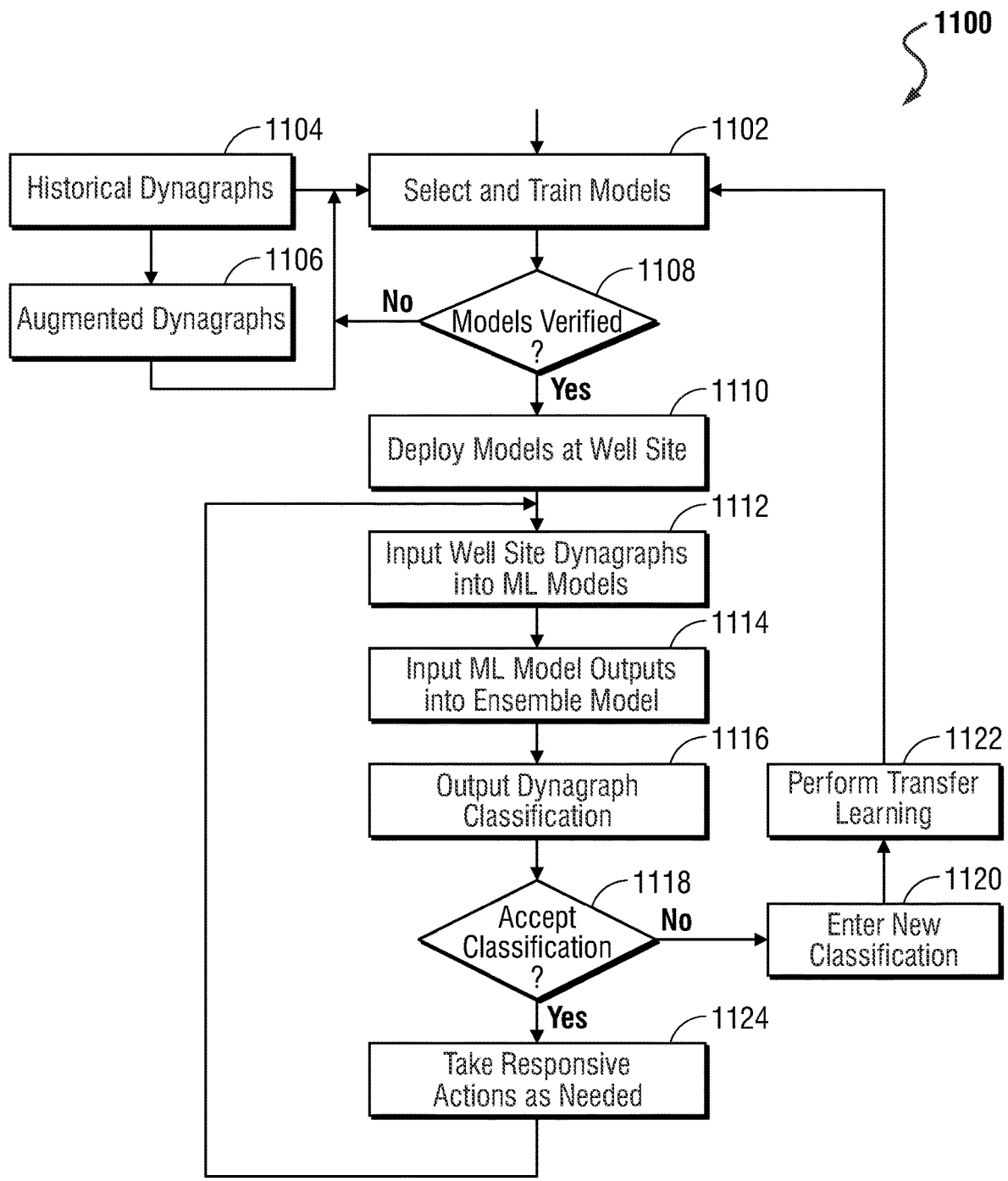
FIG. 11 illustrates an exemplary workflow for implementing well site ML-based analytics according to embodiments of the present disclosure.

Specific embodiments of the present disclosure have been discussed thus far. Following now in FIG. 11 is a general method in the form of a flow chart 1100 that may be used for implementing well site ML-based analytics according to the present disclosure. The method begins at 1102 where training is performed on one or more ML models that have been selected for the well site. The ML models may include any of the ML models discussed earlier along with other well-known ML models, depending on the well site equipment and operations (e.g., artificial lift). While not required, one or more Ensemble models that combine the outputs of several ML models can typically provide more accurate results and should also be included and trained. The training may use historical well site data, indicated at 1104, that was previously collected, preprocessed, labeled, and stored. The training data may be data points, or where the well site being monitored uses a rod pump assembly, training may be performed using images of dynagraphs or dynacards. As an optional step, augmented data, indicated at 1106, may be derived from the historical data 1104 to increase the amount of data or dynagraphs available for training.

A determination is made at 1108 to verify whether the trained models can produce sufficiently accurate results within a given QoS. Verification is preferably performed using different data from the training data. For a negative determination, the workflow 1100 returns to the model training at 1102 for additional training. If the determination is positive, the trained and verified models are deployed to the well site at 1110. This deployment can occur by bringing an edge device already equipped with the models to the well site and setting up the device. Model deployment can also occur by downloading the trained and verified models to an edge device already installed at the well site if suitable network connectivity is available.

Well site data is then provided to the edge device for input into the ML models at 1112 to monitor the well site for abnormal or non-optimal operations. The data is acquired through field sensors at the well site by an RTU that provides the data to the edge device in real time. As mentioned above, where artificial lift or other assisted production is performed at the well site, the data may be dynagraph images from a rod pump assembly. In some embodiments, the outputs from the ML models are optionally provided to an Ensemble model at 1114 to produce more accurate results. In either case, the resulting conclusions of the modeling (e.g., dynagraph classifications) are outputted at 1116, typically in terms of probabilities. This step can entail displaying the conclusions on an HMI of the edge device, storing them in a local or remote storage device or database, sending them to an external system (e.g., a SCADA host), and/or uploading them to a Cloud-computing platform for further processing.

In some embodiments, the workflow 1100 optionally allows an operator to accept or reject the conclusions from the models (e.g., dynagraph classifications) at 1118. If the operator rejects the conclusions, then he is given an opportunity at 1120 to provide alternative conclusions for the data, for example, based on his real-world experience and observations. In some embodiments, any such operator feedback may be used in a Transfer Learning process at 1122 to improve the accuracy of the models. As a further option, responsive actions may be taken automatically by the edge device at 1124 depending on the conclusions from the models. Such responsive actions may range from simply logging the date and time, to sending an alert message to the SCADA host, to adjusting motor speed or shutting off power to the rod pump assembly in the event a catastrophic failure is identified. As alluded to earlier, the specific responsive action that the edge device is programmed to take may depend on the severity of the dynagraph classifications. Thus, for example, a "fluid pound" classification may result in the edge device only sending an alert message to an appropriate system or personnel, whereas a "plunger stuck" classification may result in the edge device sending an alert message and also shutting down the rod pump assembly.

In some embodiments, the dynagraph classifications that are outputted at 1116 may be further processed and used to anticipate future pump failures. Thus, in addition to outputting the dynagraph classifications to a local or remote storage device or database, sending them to an external system, and so forth, the classifications and underlying dynagraphs may be further outputted or otherwise provided to one or more additional ML models on the edge device to anticipate future failures. These additional ML models (which may be included in the ML models 224) may be trained to predict abnormal operations at a time in the future (e.g., minutes, hours, days, etc.) based on the classifications and underlying dynagraphs. The process of implementing ML-based analytics at an edge device to anticipate future failures using dynagraph classifications, and the process of implementing ML-based analytics at the edge device to classify the dynagraphs, are similar, as discussed in FIG. 12.

Figure 12:
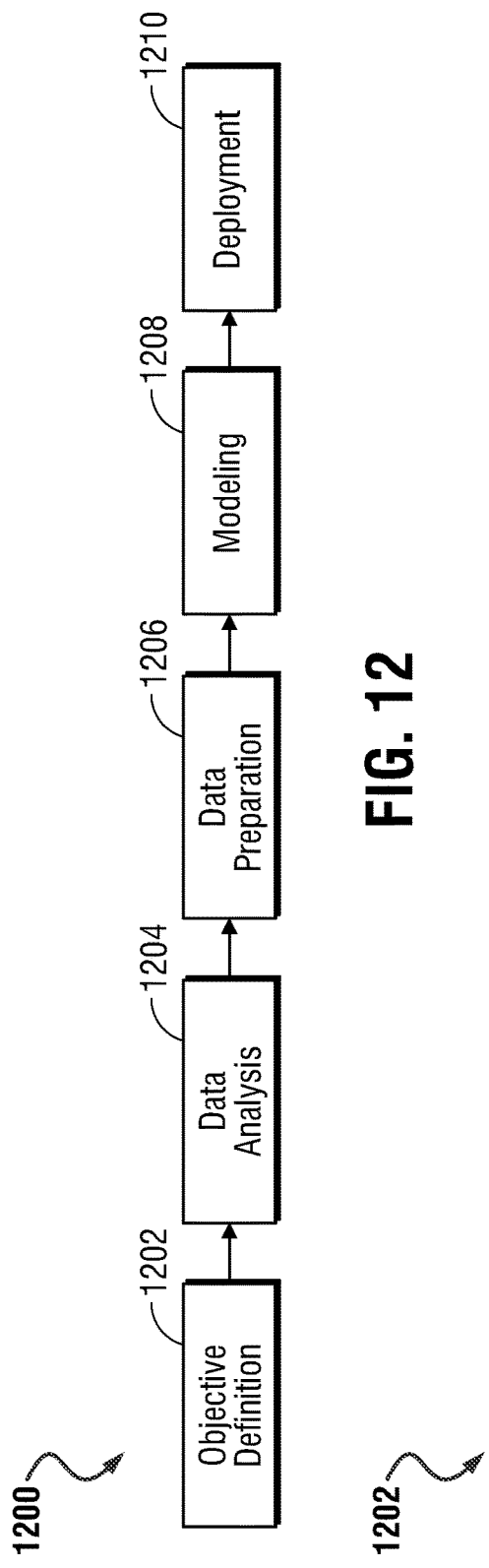
FIG. 12 illustrates an exemplary flow diagram showing implementation phases for ML-based analytics on an edge device according to some embodiments.

FIG. 12 is a flow diagram 1200 showing an overview of the phases involved in implementing ML-based analytics on an edge device. The process begins with an objective definition phase 1202 where the particular goals or objectives of the ML-based analytics are defined. The objectives may be business objectives (e.g., identify consumer preferences) or technical objectives (e.g., predict system failures), or a combination of both. Once one or more objectives are defined, an analysis is performed via a data analysis phase 1204 on the data available for achieving the objectives. The data analysis phase determines whether the available data is, or includes, a type of data that an ML model can process to achieve the objectives. After the data is analyzed, an initial set of data is prepared in a data preparation phase 1206 for use in training an ML model to achieve the objectives. The data preparation phase includes, among other things, labeling and annotating the data or certain features of the data that are important to achieving the objectives. This phase is followed by a modeling phase 1208 in which the training data sets are applied to train one or more ML models to achieve the objectives. Unlabeled or raw data sets can also be applied to the ML models in the modeling phase 1208 to verify the effectiveness of the training. Lastly, whichever model or models produce the best (i.e., most accurate) results based on a predefined QoS are deployed at the edge device in a deployment phase 1210.

The flow diagram 1200 and the various phases therein can be used to implement ML-based analytics to classify dynacards at an edge device, as described above. The flow diagram 1200 can also be used to implement ML-based analytics to achieve other objectives at an edge device. For example, in addition to classifying dynacards according to failure modes, embodiments of the present disclosure may implement ML-based analytics at an edge device to anticipate future failures based on the dynacard classifications.

Figure 13:
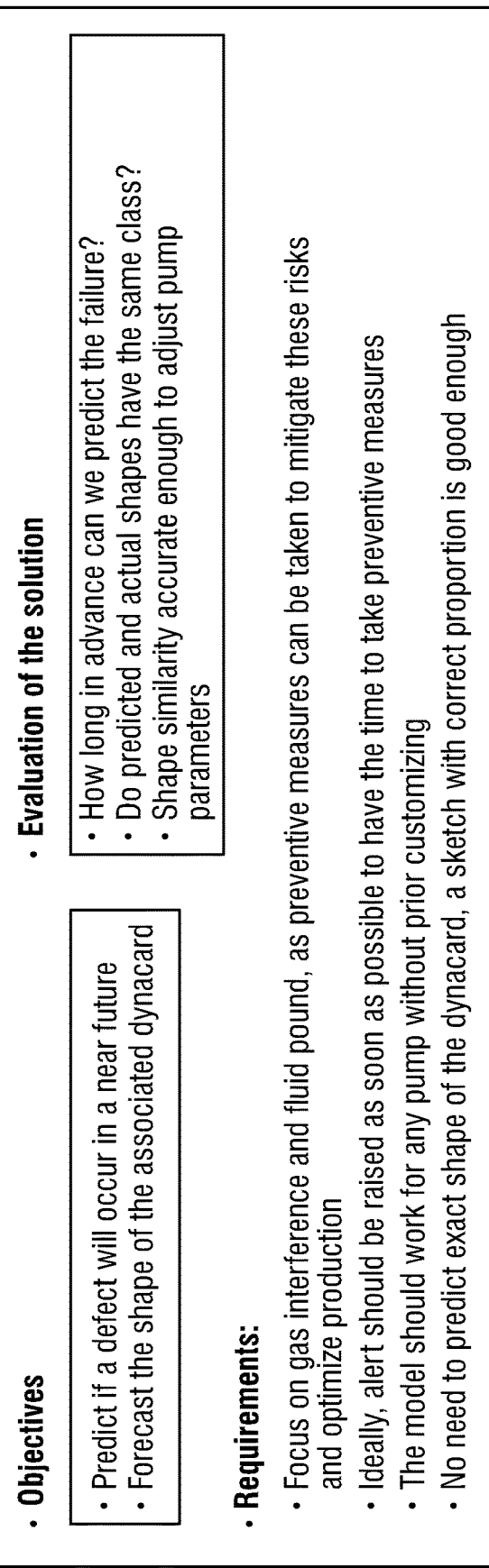
FIG. 13 illustrates an exemplary objective definition phase for ML-based analytics to anticipate future failures at an edge device in some embodiments.

FIG. 13 illustrates exemplary details of the objective definition phase 1202 for implementing ML-based analytics at an edge device to anticipate future failures in some embodiments. Such a failure anticipation function or tool may be implemented as part of the monitoring and control application 220 (FIG. 2) in some embodiments. As can be seen in FIG. 13, one objective of the failure anticipation function may be to predict whether a defect or failure will occur at a pump assembly in the near future based on the dynacard classifications. A related objective may be to forecast the shape of the dynacards associated with any anticipated failures. To achieve these objectives, several points also need to be considered. For example, how far in advance can the failures be predicted, and should the dynacard shapes for the predicted failure and the dynacard shapes for the actual failure have the same classification. Additionally, can shape similarity predictions be sufficiently accurate to justify adjusting pump parameters. Some exemplary requirements for achieving the objectives include an initial focus on two types of failure modes, namely gas interference and fluid pound, as preventive measures can be taken to mitigate these failure modes. An ideal or preferred embodiment should raise an alert as soon as possible so there is sufficient time for a control system and/or an operator to take preventive measures. As well, the ML models should operate effectively for any pump assembly without prior customization, and there should be no need to predict the exact shape of the dynacard (i.e., a sketch with correct proportion is good enough).

FIGS. 14-18 show exemplary details of the data analysis phase 1204 for the failure anticipation function in some embodiments.

Referring to FIG. 14, various data features need to be considered for the data to be used. As mentioned earlier, the data to be used includes the dynacards and the classifications thereof (e.g., as outputted at 1116 in FIG. 11) in some embodiments. The features from this data that could be used for failure anticipation include the dynacard timestamp (YYYY-MM-DD, HH:MM:SS), the dynacard stroke number (integer), whether the dynacard represents an outlier (Boolean), the particular pump for the dynacard, rod displacement vertices (abscise vertices), load vertices (ordinate vertices), and failure probability. In the example shown, the dynacards were derived from two different wells, Well A (5 pumps) and Well B (3 pumps), over a period of several months, and involved 8 failure modes or classifications indicated by 8 probabilities.

FIG. 15 shows a list of the failure classifications and the number of occurrences at each well for each classification in some embodiments. These classifications are generally well known to those skilled in the artificial lift art and include fluid pound, gas interference, gas lock, normal, plunger stuck, solids grinding, solids in pump, and worn pump. Other dynacard classifications besides the ones shown here may also be used.

FIG. 16 shows examples of other considerations that may be factored into the data analysis phase 1204. For example, it has been observed that failure anticipation works best when the ML models are provided with a regular sequence of consecutive dynacards and the classifications therefor. Any gaps or holes in the sequence (e.g., due to data communication issues) or irregular time steps (e.g., due to variation in pump operation parameters or sensor data processing time) can negatively affect the failure anticipation. Analyzing a sequence of, say, 10 dynacards spread over several minutes is different from analyzing 10 dynacards spread over several hours for purposes of the embodiments herein. Consequently, the timestamps of the dynacards in the sequence need to be analyzed and if the difference in timestamps between the first and the last (e.g., 10th) dynacard exceeds some threshold value, the failure anticipation may not output a sufficiently accurate prediction.

Figure 17:
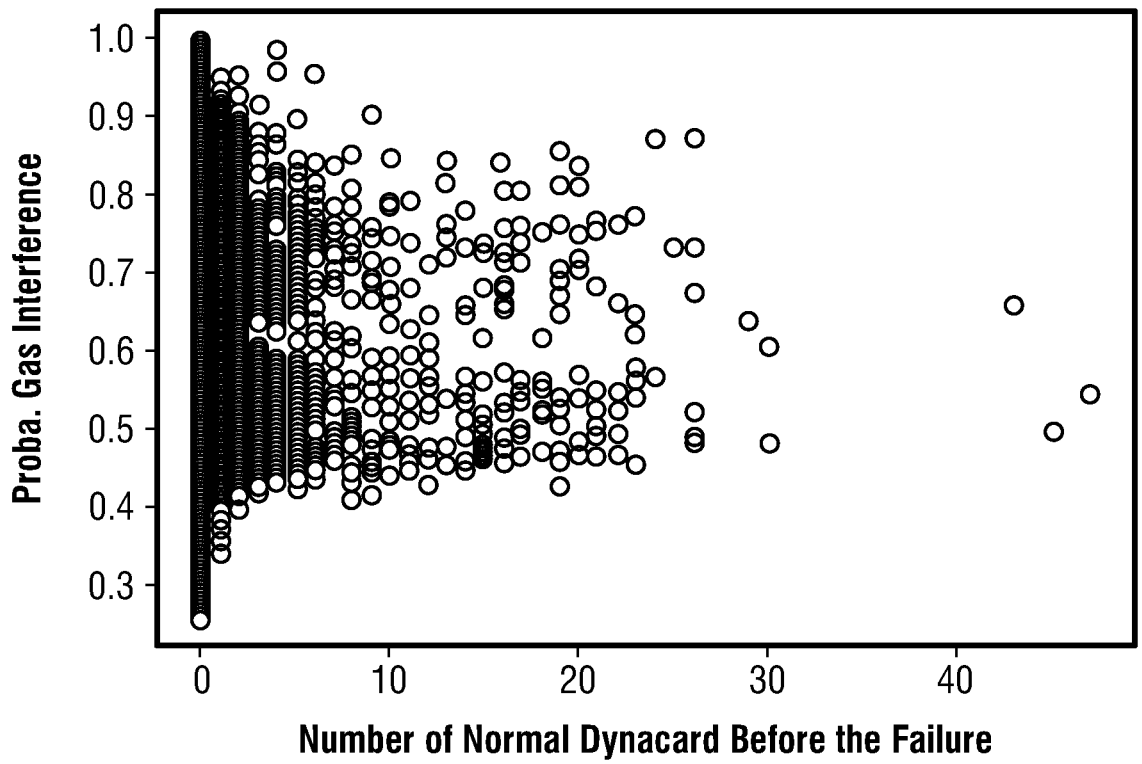
FIG. 17 illustrates data that supports use of a series of consecutive dynacards to anticipate future failures at an edge device in some embodiments.

It has also been observed, referring to FIG. 17, that failure anticipation works better when the ML models are provided with at least 10 consecutive dynacards and classifications, although fewer than 10 (e.g., 9, 8, 7, 6, 5, etc.) consecutive dynacards and classifications may certainly be used depending on the QoS needed. It has additionally been observed that failure anticipation works best when the ML models are provided with at least 10 consecutive dynacards with "normal" classifications, although other types of dynacards classifications may certainly be used depending on the QoS needed.

Figure 18:
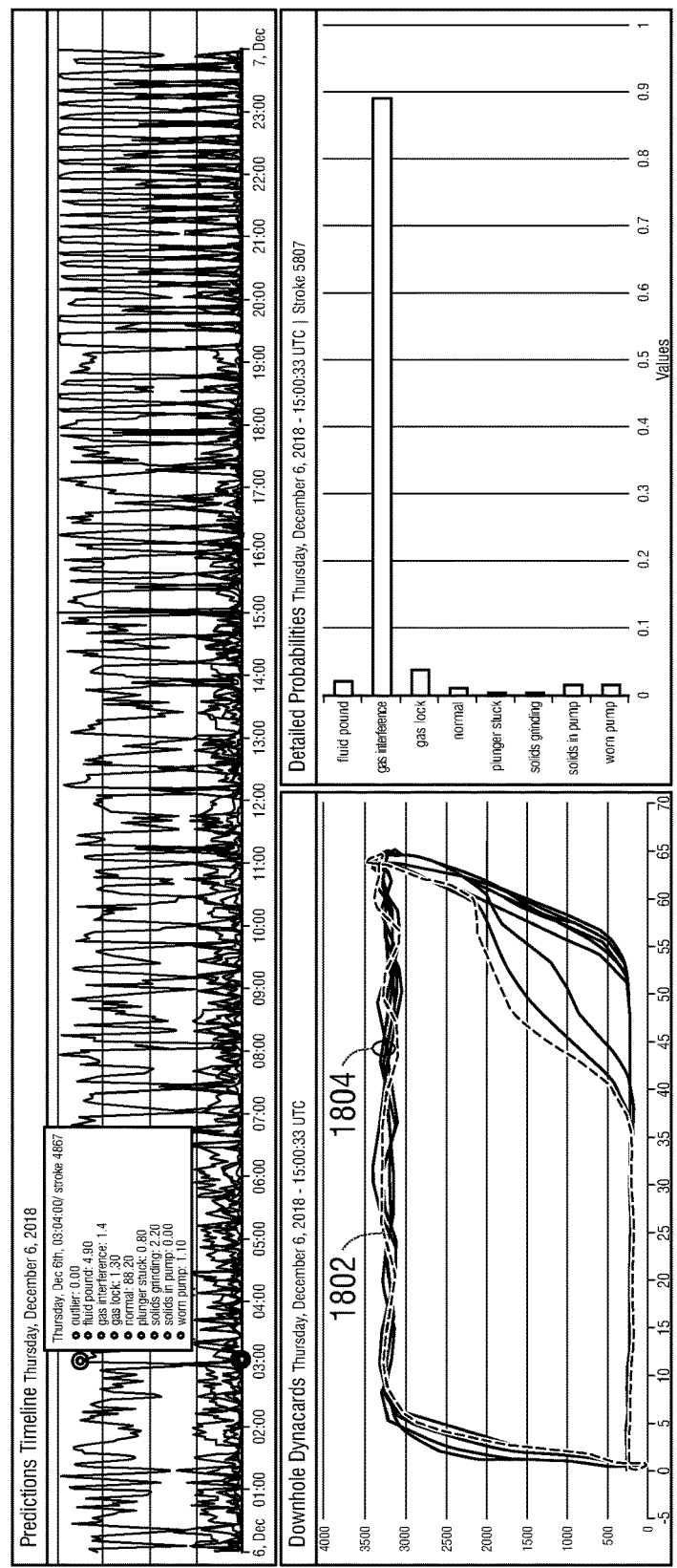
FIG. 18 illustrates exemplary dynacard evolutions showing feasibility of using ML-based analytics to anticipate future failures at an edge device in some embodiments.

FIG. 18 illustrates an example of dynacard evolution over time that shows the feasibility of using dynacard classifications to anticipate future failures. In the figure, several graphs representing overlapping dynacards are shown at 1800. The red graph 1802 represents a particular dynacard at a given time t while light blue graphs 1804 represent a number of preceding dynacards. As can be seen, the shapes of the dynacards evolve over time from a generally rectangular shape of the light blue dynacards 1804 toward a deviated shape of the red dynacard 1802. This shows that dynacards can (and do) evolve progressively following a trend that can be observed and predicted. On the other hand, certain types of "random" evolution have also been observed that cause an abrupt shape change between two consecutive dynacards, such as when solids enter the pump. These latter types of pump problems cannot be readily or easily predicted, as they rarely manifest any clear early signs that would allow the problems to be anticipated.

FIGS. 19-22 illustrate exemplary details of the data preparation phase 1206 for the failure anticipation function in some embodiments.

Figure 19:
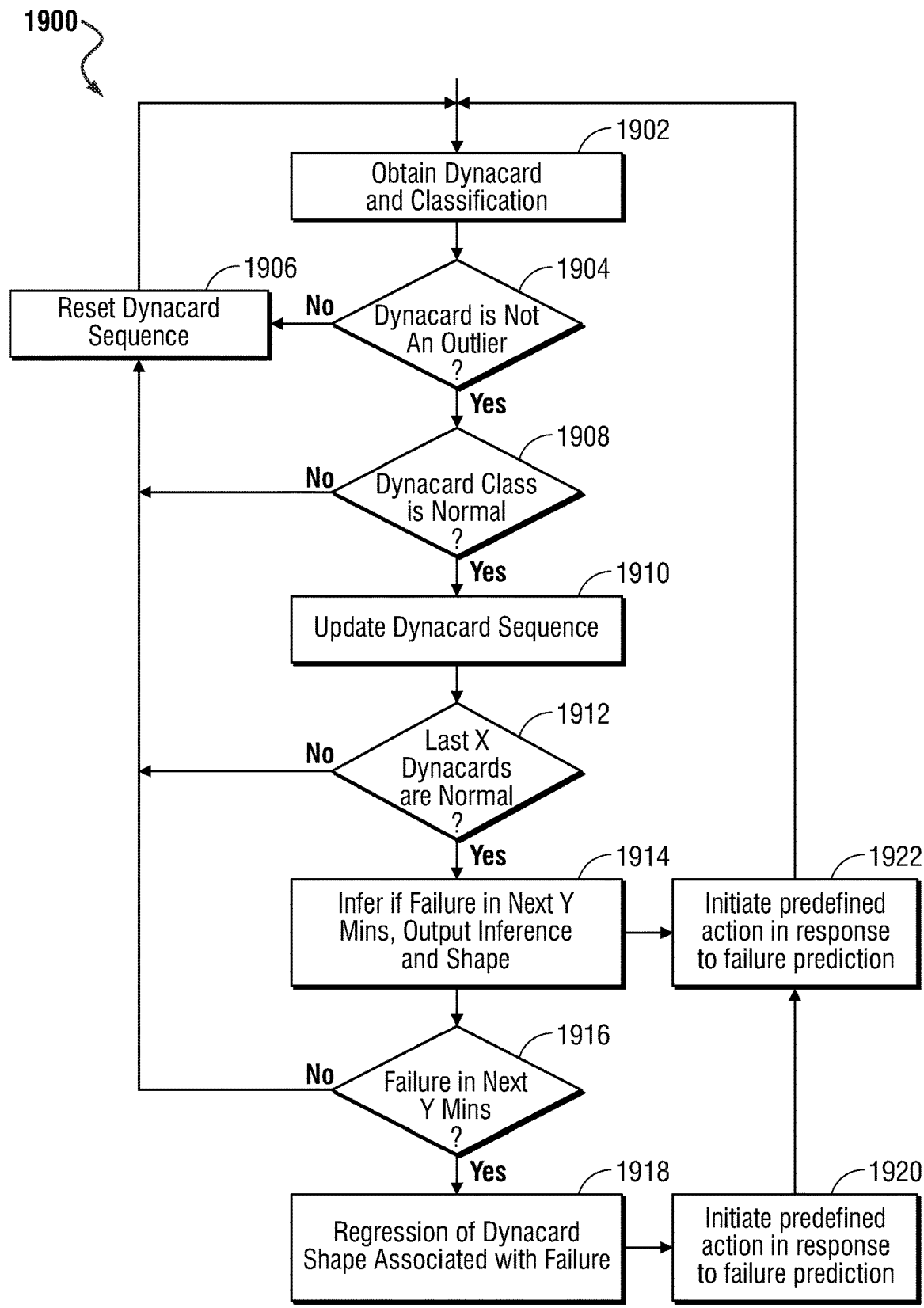
FIG. 19 illustrates an exemplary flow diagram for a method of using ML-based analytics to anticipate future failures at an edge device in some embodiments.

Referring to FIG. 19, an exemplary flow diagram 1900 is shown for a method that may be used in the data preparation phase 1206. In general, the method predicts a failure if the ML models infer that some pump defect will likely occur during normal operations based on a certain number of consecutive "normal" dynacards, and also predicts the shape of the dynacard corresponding to the failure if the ML models infer that there will likely be a defect. In some embodiments, the shapes of the dynacards that are predicted may resemble the dynacard shapes shown in FIG. 3, depending on the particular failure mode that the ML models infer. Thus, if the ML models infer that a "fluid pound" condition will soon occur, then the dynacard shape that the ML models predict may resemble one of the dynacard shapes indicated at 300 for fluid pound in FIG. 3, and so forth.

The method generally begins at 1902 where a dynacard and classification thereof is obtained (e.g., from the output at 1116 in FIG. 11). At 1904, a determination is made whether the dynacard class is not a statistical "outlier." If no, that dynacard is ignored and the sequence of dynacard is reset at block 1906, and the method returns to 1902 to obtain the next dynacard and classification. If yes, then a determination is made at 1908 whether the dynacard classification is "normal." If no, that dynacard is also ignored and the sequence of dynacard is reset at block 1906. If yes, the dynacard is counted as part of the current dynacard sequence and the number of dynacards in the sequence is updated accordingly at 1910.

At 1912, a determination is made whether the last X dynacards all have "normal" classification, where X may be at least 10, for example, depending on the particular application. If no, the sequence of dynacard is reset at block 1906 and the method returns to 1902 to obtain the next dynacard and classification. If yes, the sequence of X dynacards is provided or otherwise input to the ML models for inference at 1914 to see if a failure will likely occur in the next Y minutes, where Y may be, for example, 10 minutes or some other time interval incorporated into the ML models. If the ML models infer that a failure will likely occur in the next Y minutes, then the models also infer the dynacard shape associated with the predicted failure.

At 1916, a determination is made whether a failure occurred in the next Y minutes, as predicted by the models. If no, then the sequence of dynacard is reset at block 1906 and the method returns to 1902 to obtain the next dynacard and classification. If yes, then the dynacard shape associated with the failure is fed back to the ML models at 1918 for regression analysis and further model training. Thereafter, the method returns to 1902 to obtain the next dynacard and classification.

Optionally, although not technically part of data preparation, in some embodiments, one or more predefined actions may be taken at 1920 and/or 1922 in response to a failure actually occurring at 1918 or being predicted at 1914. Such action may range from logging the date and time of the failure, to sending an alert message to a SCADA system and/or appropriate personnel, to adjusting motor speed, and shutting off power to a motor unit, and the like. The specific responsive action taken may be programmed to depend on the severity of failure mode predicted and how soon failure will occur. Thus, for example, if a "fluid pound" condition is predicted to occur within two days, then an alert message may be set to an appropriate system or personnel, whereas if a "fluid pound" condition was predicted to occur within two minutes, then an alert message may be automatically sent in conjunction with adjustments being automatically made to the motor speed or other pump parameters.

Figures 20, 21:
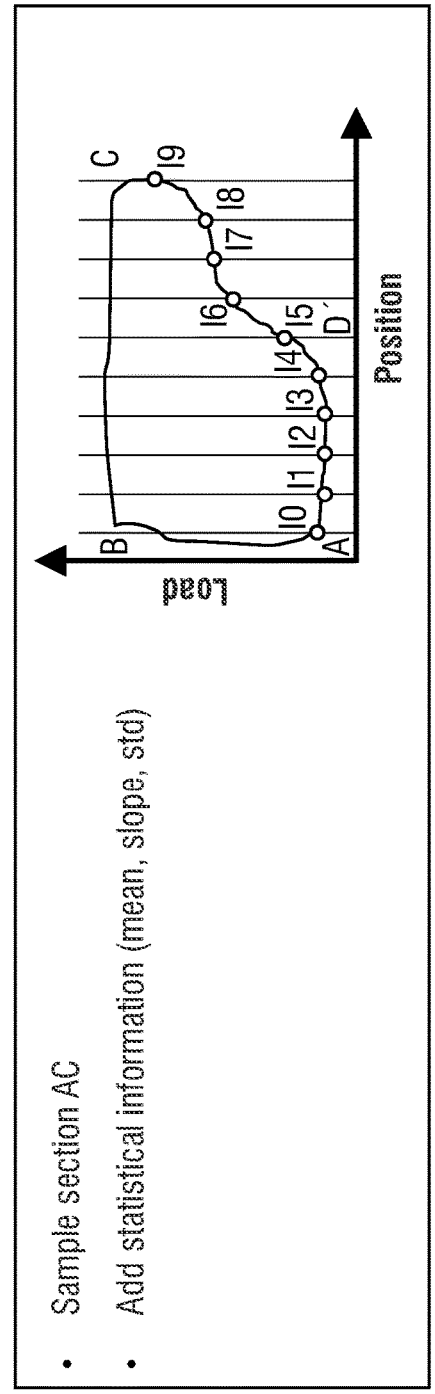
FIG. 20 illustrates exemplary training data criteria for training ML models to anticipate future failures at an edge device in some embodiments.
FIG. 21 illustrates exemplary model inputs for training ML models to anticipate future failures at an edge device in some embodiments.

FIG. 20 shows exemplary criteria for preparing a training data set that may be used to train the ML models for failure anticipation in some embodiments. It has been observed that failure anticipation works best when the ML models are trained with training data that contains sufficiently long sequences of normal dynacards (e.g., at least 10, 9, 8, 7, 6, 5, etc., consecutive dynacards) followed by a dynacard with one of the problem classifications, such as fluid pound or gas interference. Training data for the ML models may also be augmented to create additional data sets in the manner described earlier herein to enhance model training.

FIG. 21 shows some of the inputs that are provided to the ML models from each dynacard. As can be seen, each dynacard can be generally defined by four points, A, B, C, D, indicating the corners of the dynacard, with the vertical axis representing the load on the rod and the horizontal axis representing the position or displacement of the rod. In some embodiments, the inputs to the ML models are obtained by sampling each dynacard along segment ADC of the dynacard, although segment ABC may also be used within the scope of the present disclosure. The model inputs may also include certain statistical information on the samples, such as the mean, slope, standard deviation, and the like.

Figure 22:
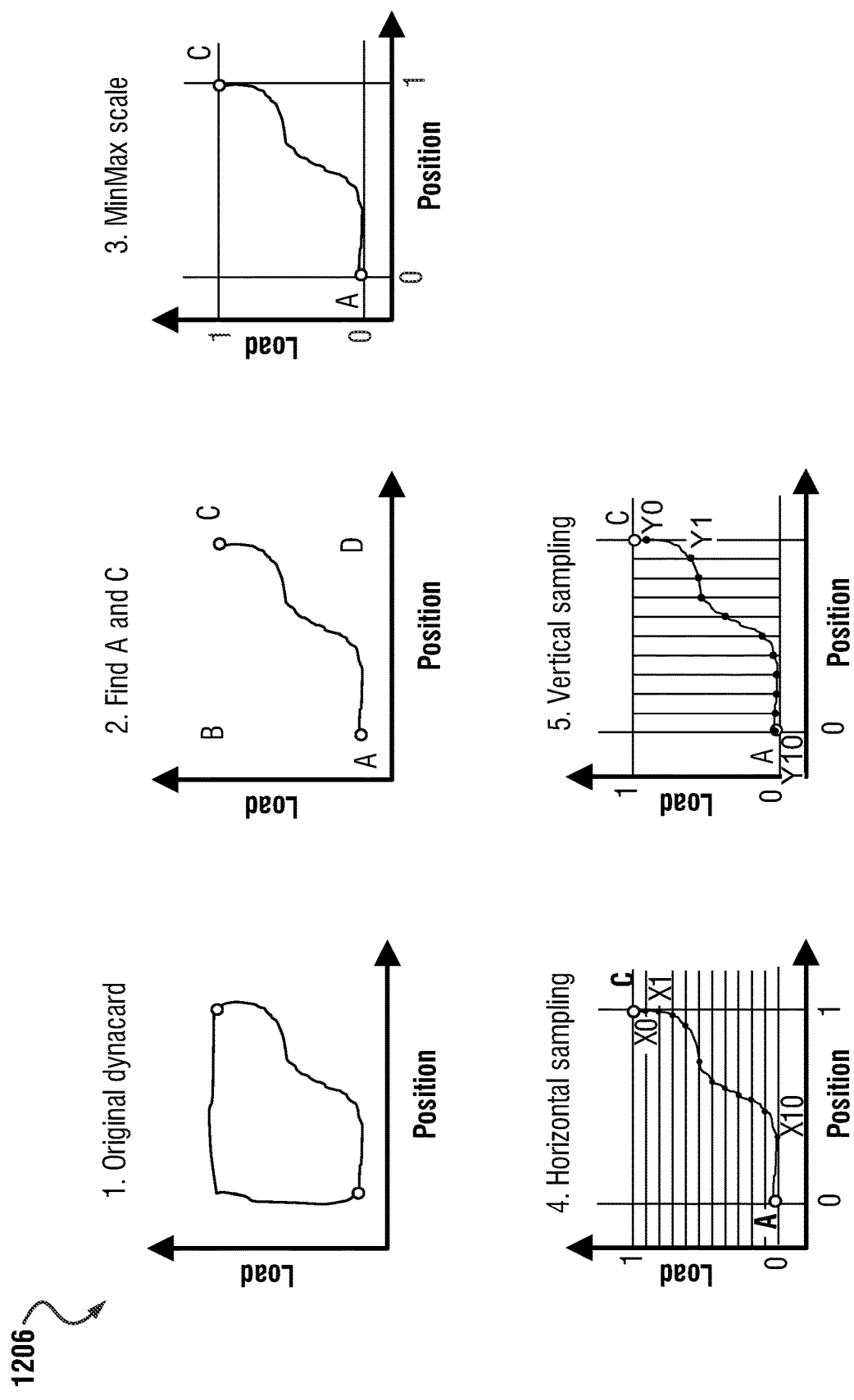
FIG. 22 illustrates an exemplary technique for sampling dynacards to anticipate future failures at an edge device in some embodiments.

FIG. 22 shows several graphs depicting more details on an exemplary technique for sampling the dynacards. The original dynacard is shown at graph 1. At graph 2, segment A-C is identified for the dynacard, as shown. At graph 3, a Min/Max scale is defined, for example, with 1 being the maximum and 0 being the minimum. At graph 4, a number of samples of segment A-C are obtained along the horizontal axis, for example, 10 samples. At graph 5, a number of samples of segment A-C are obtained along the vertical axis, for example, 10 samples. The samples are then used as inputs to the ML models for training purposes. Dynacard samples used as inputs during live operation may be obtained in a similar manner.

FIGS. 23-27 illustrate exemplary details for the modeling phase 1208 of the failure anticipation function in some embodiments.

Referring to FIG. 23, several ML models can be used to implement the failure anticipation function disclosed herein. Some of these ML models include the LSTM (long short term memory), XGBoost, CNN LSTM (convolution neural network LSTM), as well as a combination of statistical and momenta approaches. Embodiments of the failure anticipation function described herein contemplate using any one or a combination of these ML models to predict failures in advance.

FIG. 24 shows an exemplary confusion matrix 2400 that may be used to evaluate the performance of the trained ML models. From the matrix 2400, it can be seen see how many positive predictions have been verified as correct (meaning there will be a problem on the pump in the near future) and how many negative predictions have been verified as correct (meaning there will be no problem on the pump in the near future). It can also be seen how many positive and negative predictions were verified as wrong, meaning the model predicted there will be a problem and in actuality no problem occurred (i.e., false positives or FP), or the model predicted there will be no problem and in reality a problem occurred (i.e., false negatives or FN). For reference, the data used to build this confusion matrix 2400 was obtained from 4 wells over a period of approximately 1 month.

FIG. 25 shows exemplary operation of the failure anticipation function in some embodiments. In the figure, the column labeled "Index" indicates the dynacard number, and is the same as stroke_nb from FIG. 14. The column labeled "Class" indicates the classification of the dynacard. The "Prediction" column indicates whether and how many failures are predicted. The "Time to Failure" column indicates the time to failure in seconds. Failure prediction is based on the premise that a failure is correctly predicted if there is at least one true positive (TP) before a failure, and the anticipation time is the delta time between the first TP and the failure. As can be seen, the ML model predicted a failure was likely to occur based on dynacards 56315, 56316, and 56317, and that the failure was likely to occur in 485 seconds, 454 seconds, and 418 seconds, respectively. However, that failure prediction was invalidated based on the ML model subsequently predicting no failure for the next four dynacards, but one or more of those dynacards turned out to be an actual failure (i.e., a false negative or FN). Beginning with dynacard 56322, the ML model again predicted that a failure was likely to occur in 241 seconds. This prediction is counted as valid because a failure did actually occur at 241 seconds.

FIG. 26 shows a statistical analysis of the anticipation time, or time to failure, for true positives predicted by the ML model of the anticipation function in some embodiments.

FIG. 27 shows a statistical analysis of several metrics observed in the predictions provided by the ML model of the anticipation function in some embodiments.

Figure 28:
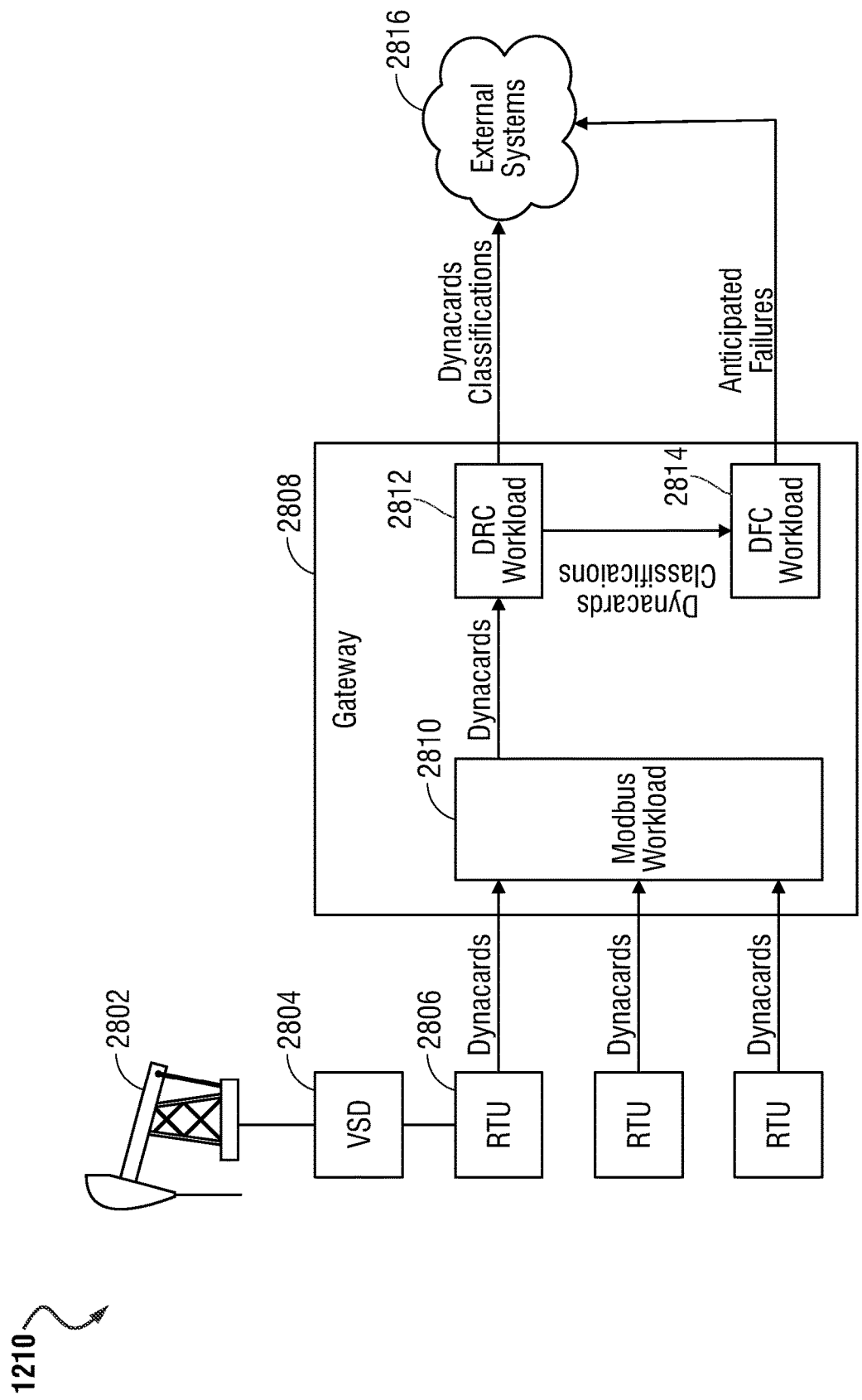
FIG. 28 illustrates an exemplary implementation of ML-based analytics to anticipate future failures at an edge device according to some embodiments.

FIG. 28 illustrates exemplary details of the deployment phase 1210 of the failure anticipation function in some embodiments. As mentioned, the anticipation function is to be deployed at the edge, meaning it will run on a local gateway device at the well site. In one example, the anticipation function can be deployed using a solution from Kelvin, Inc., which offers a platform that allows users to build, deploy, and manage applications alongside automation systems.

In the exemplary deployment of FIG. 28, a rod pump assembly 2802 includes a variable speed drive (VSD) 2804 that controls a motor unit (not expressly shown) for the rod pump assembly. A remote terminal unit (RTU) 2806 gathers data about various aspects of the rod pump assembly operation, including operation of the VSD 2804, for monitoring and tracking purposes. The RTU 2806 also collects measurements from various wireless and wired field sensors (not expressly shown) around the well site. From this data, the RTU 2806 generates dynacards, each dynacard representing a graph or plot of the tension or load (vertical axis) versus the displacement (horizontal axis) on the rod in the rod pump assembly 2802.

An edge device 2808, such as a gateway, provides network access or entry for the RTU 2806 and other RTUs at the well site to communicate the collected data to an external system, such as a supervisory control and data acquisition (SCADA) system and/or a private or public network (e.g., the Internet). In some embodiments the gateway may include a Modbus workload component 2810 or similar component that receives the dynacards from the RTU 2806 and other RTUs at the well site. The Modbus workload component 2810 provides the dynacards to a dynacard recognition component (DRC) 2812 in the gateway 2808. The DRC 2812 processes and classifies the dynacards according to one of several dynacard classifications in the manner described herein. The DRC 2812 then communicates the dynacard classifications to a dynacard forecasting component (DFC) 2814 in the gateway 2808. The DFC 2814 analyzes the sequences of dynacards and classifications and predicts whether there is going to be a problem on the pump assembly 2802 in the near future, in the manner described herein. If yes, the DFC 2814 also predicts the shape of the dynacard associated with or representative of this future problem. The DRC 2812 and the DFC 2814 thereafter output their results to one or more external systems 2816.

From the foregoing, it will be appreciated that an edge gateway equipped with ML-based analytics as discussed herein can be deployed in a number of ways, including as a stand-alone on-premise solution where the edge gateway has no connectivity to a Cloud platform. This stand-alone solution integrates seamlessly with existing or new SCADA systems where feedback from the edge gateway can be used in a centralized manner to support real-time decisions that help improve operational efficiency. An on-premise solution is preferable where there is limited to no WAN connectivity, or where operators are hesitant to share data on a Cloud platform through a public Internet connection.

Alternatively, an edge gateway with ML-based analytics can take advantage of full Cloud connectivity where multiple such gateways can be maintained and managed via a Cloud platform. This option allows real-time data collected from multiple edge gateways to be used to retrain ML models, resulting in more accurate applications at the edge. This retraining process can be automated and retrained models can be deployed to multiple gateways based on a preset schedule, whenever model accuracy reaches a predefined level, or when a unique dynagraph card is added (e.g., via Transfer Learning).

For additional details and specific exemplary implementations of various embodiments of the present disclosure, the reader is referred to SPE-192019-MS ("Edge Analytics and Future of Upstream Automation"), SPE-192513-MS ("IIoT Edge Analytics: Deploying Machine Learning at the Wellhead to Identify Rod Pump Failure"), and SPE-192886-MS ("Edge Analytics at the Wellhead: Designing Robust Machine Learning Models for Artificial Lift Failure Detection").

In the preceding discussion, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a private area network (PAN), local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A method of anticipating failure modes at a well site, comprising:
   receiving dynacards from a remote terminal unit (RTU) at the well site;
   performing machine learning (ML) based analytics on an edge device at the well site using the dynacards from the RTU;
   identifying dynacard classifications on the edge device for the well site operations from the ML-based analytics performed on the dynacards;
   determining on the edge device at the well site that a predefined number of dynacards having a specified dynacard classification has been identified;
   performing ML-based analytics on the edge device at the well site using the predefined number of dynacards having the specified dynacard classification;
   predicting a failure mode and a time to failure on the edge device at the well site from the ML-based analytics performed on the predefined number of dynacards having the specified dynacard classification; and
   initiating a responsive action on the edge device based on the failure mode and the time to failure, the responsive action including at least one of logging a date and time, sending an alert message to a control system, adjusting a motor speed of a rod pump, or shutting off power to the rod pump, depending on a severity of the failure mode and the time to failure.

2. The method of claim 1, wherein predicting a failure mode and a time to failure comprises predicting a dynacard shape associated with the failure mode on the edge device at the well site from the ML-based analytics performed on the predefined number of dynacards and the specified dynacard classification.

3. The method of claim 1, wherein the predefined number of dynacards comprises a predefined number of consecutive dynacards.

4. The method of claim 3, wherein the specified dynacard classification is a normal classification.

5. The method of claim 1, wherein predicting a failure mode comprises predicting one of: a fluid pound failure or a gas interference failure.

6. The method of claim 1, wherein performing ML-based analytics using the dynacard classifications includes inputting the dynacard classifications into one or more ML models.

7. The method of claim 6, wherein the one or more ML models are trained using historical data, further comprising generating augmented training data using the historical data.

8. An edge device installed at a well site and operable to anticipate failure modes at the well site, comprising:
   a processor, and
   a storage device coupled to the processor and storing computer-readable instructions for performing a failure anticipation function thereon;
   wherein the failure anticipation function, when executed by the processor, causes the edge device to:
   obtain dynacards and dynacard classifications for the well site;
   identify a predefined number of dynacards having a specified dynacard classification;
   perform ML-based analytics using the predefined number of dynacards having the specified dynacard classifications classification;
   predict a failure mode and a time to failure from the ML-based analytics performed on the predefined number of dynacards having the specified dynacard classification; and
   initiate a responsive action on the edge device based on the failure mode and the time to failure, the responsive action including at least one of logging a date and time, sending an alert message to a control system, adjusting a motor speed of a rod pump, or shutting off power to the rod pump, depending on a severity of the failure mode and the time to failure.

9. The edge device of claim 8, wherein the failure anticipation function further causes the edge device to predict a dynacard shape associated with the failure mode from the ML-based analytics performed on the predefined number of dynacards having the specified dynacard classification.

10. The edge device of claim 8, wherein the predefined number of dynacards comprises a predefined number of consecutive dynacards.

11. The edge device of claim 10, wherein the specified dynacard classification is a normal classification.

12. The edge device of claim 8, wherein the failure anticipation function causes the edge device to predict a failure mode by predicting one of: a fluid pound failure or a gas interference failure.

13. The edge device of claim 8, wherein the failure anticipation function causes the edge device to perform ML-based analytics by inputting the dynacard classifications into one or more ML models.

14. The edge device of claim 13, wherein the one or more ML models are trained using historical data and augmented training data generated using the historical data.

15. A method of anticipating failure modes at a well site, comprising:
   obtaining dynacards and dynacard classifications for the well site on the edge device at the well site;
   identifying on the edge device at the well site a predefined number of dynacards having a specified dynacard classification;
   performing ML-based analytics on the edge device at the well site using the predefined number of dynacards having the specified dynacard classification;
   predicting a failure mode and a time to failure on the edge device at the well site from the ML-based analytics performed on the predefined number of dynacards having the specified dynacard classification; and
   initiating a responsive action on the edge device based on the failure mode and the time to failure, the responsive action including at least one of logging a date and time, sending an alert message to a control system, adjusting a motor speed of a rod pump, or shutting off power to the rod pump, depending on a severity of the failure mode and the time to failure.

16. The method of claim 15, wherein predicting a failure mode and a time to failure comprises predicting a dynacard shape associated with the failure mode on the edge device at the well site from the ML-based analytics performed on the predefined number of dynacards having the specified dynacard classification.

17. The method of claim 15, wherein the predefined number of dynacards is a predefined number of consecutive dynacards.

18. The method of claim 17, wherein the specified dynacard classification is a normal classification.

19. The method of claim 15, wherein predicting a failure mode comprises predicting one of: a fluid pound failure or a gas interference failure.

20. The method of claim 15, wherein performing ML-based analytics using the dynacard classifications includes inputting the dynacard classifications into one or more ML models.

* * * * *